(12) United States Patent
Krefting

(10) Patent No.: US 10,639,949 B2
(45) Date of Patent: May 5, 2020

(54) APPARATUS FOR SECURING AND SEALING A PNEUMATIC TIRE TO A WHEEL

(71) Applicant: Cushcore, Inc., Bend, OR (US)

(72) Inventor: Adam Krefting, Bend, OR (US)

(73) Assignee: CushCore, Inc., Bend, OR (US)

( * ) Notice: Subject to any disclaimer, the term of this patent is extended or adjusted under 35 U.S.C. 154(b) by 143 days.

(21) Appl. No.: 16/013,906

(22) Filed: Jun. 20, 2018

(65) Prior Publication Data
US 2018/0370303 A1    Dec. 27, 2018

Related U.S. Application Data

(60) Provisional application No. 62/522,745, filed on Jun. 21, 2017.

(51) Int. Cl.
*B60C 25/14* (2006.01)
*B60C 15/02* (2006.01)
*B60C 15/028* (2006.01)

(52) U.S. Cl.
CPC ............ *B60C 25/14* (2013.01); *B60C 15/028* (2013.01); *B60C 15/0209* (2013.01)

(58) Field of Classification Search
CPC . B60C 15/0209; B60C 15/0213; B60C 25/14; B60C 25/145
See application file for complete search history.

(56) References Cited

U.S. PATENT DOCUMENTS

| 5,271,443 | A | * | 12/1993 | Boni | ........................ | B60B 21/12 |
|           |   |   |         |      |                          | 152/381.4  |
| 10,137,729 | B2 | * | 11/2018 | Teixeira | .................. | B60C 15/02 |
| 10,377,171 | B2 | * | 8/2019  | Teixeira | ................ | B60C 15/028 |

* cited by examiner

*Primary Examiner* — David B. Thomas
(74) *Attorney, Agent, or Firm* — Hancock Hughey LLP

(57) ABSTRACT

An annular and ring extends around the interior of a wheel/rim on which a tire is mounted. The inner diameter of the annular ring is sized for a snug fit on the wheel rim. A tensioning cable extends through the tubular ring and opposed arms are attached to the ring and are movable between disengaged and engaged positions. The apparatus is selectively movable by actuation of a cable tensioner between a first, disengaged position where the arms do not engage the tire and thereby lock it to the rim, and a second, engaged position in which the arm bear against the tire beads, capturing the tire beads between the rim flanges and the wing members to lock the tire to the rim and to create and/or enhances the air-tight seal between the tire and the rim. The bead lock apparatus may be beneficially used in combination with a foam insert for enhanced tire performance.

20 Claims, 15 Drawing Sheets

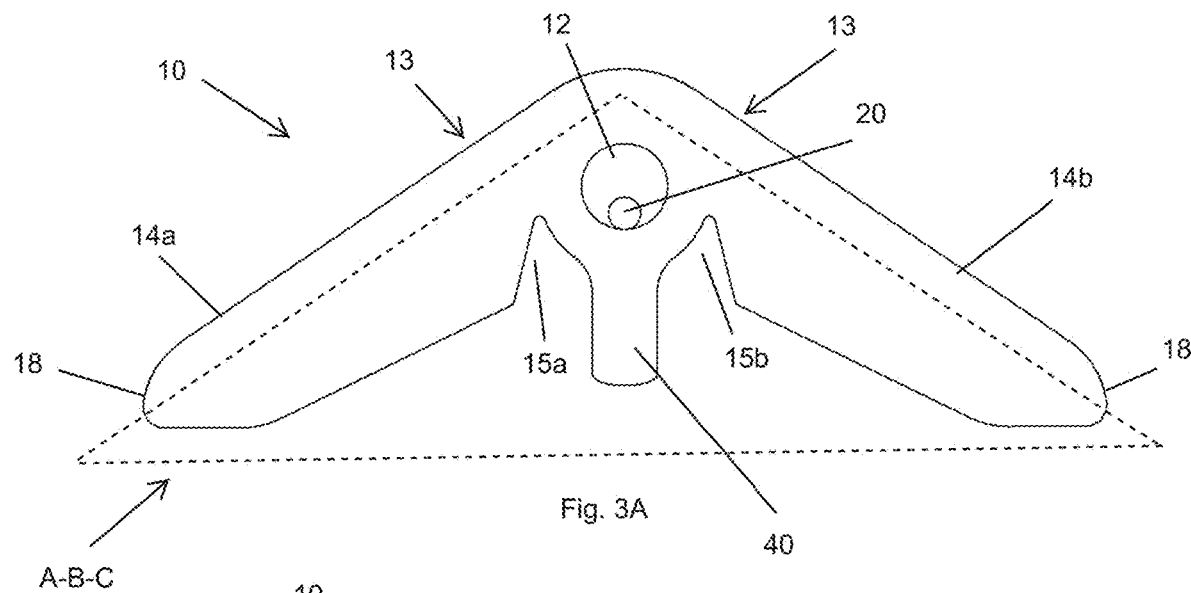
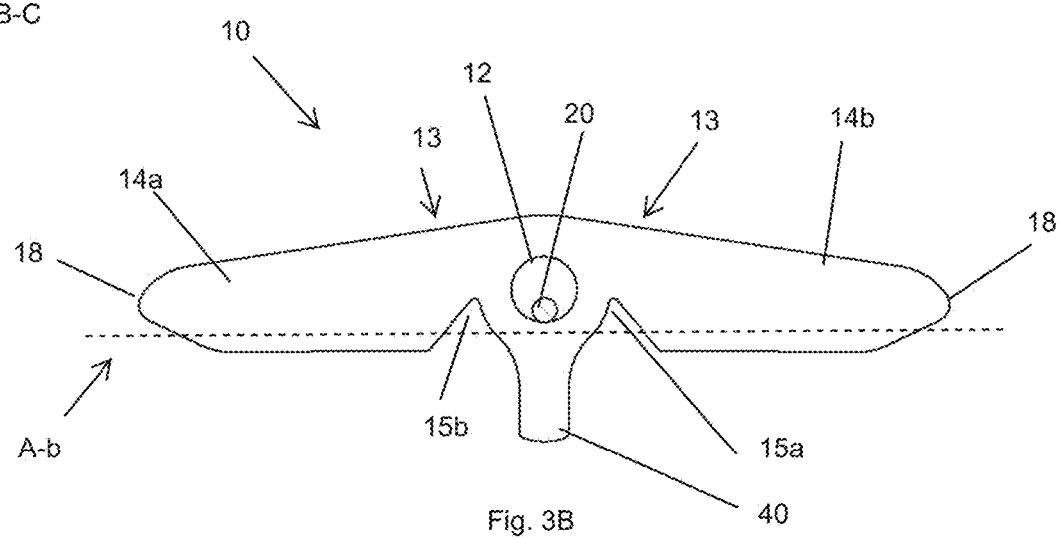

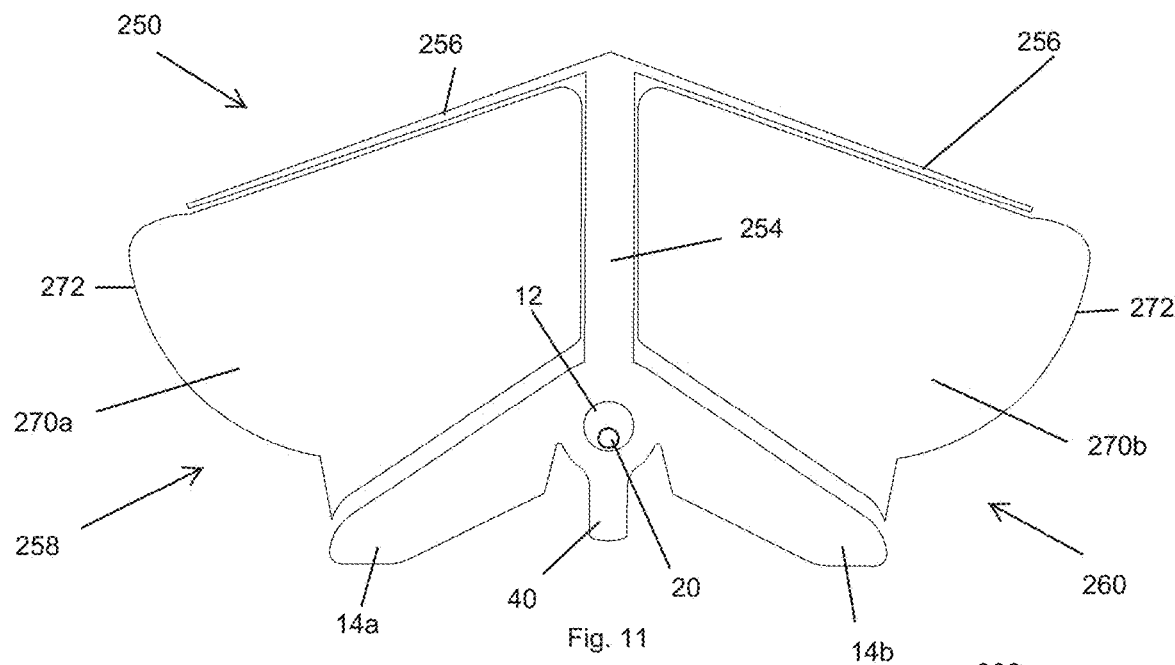
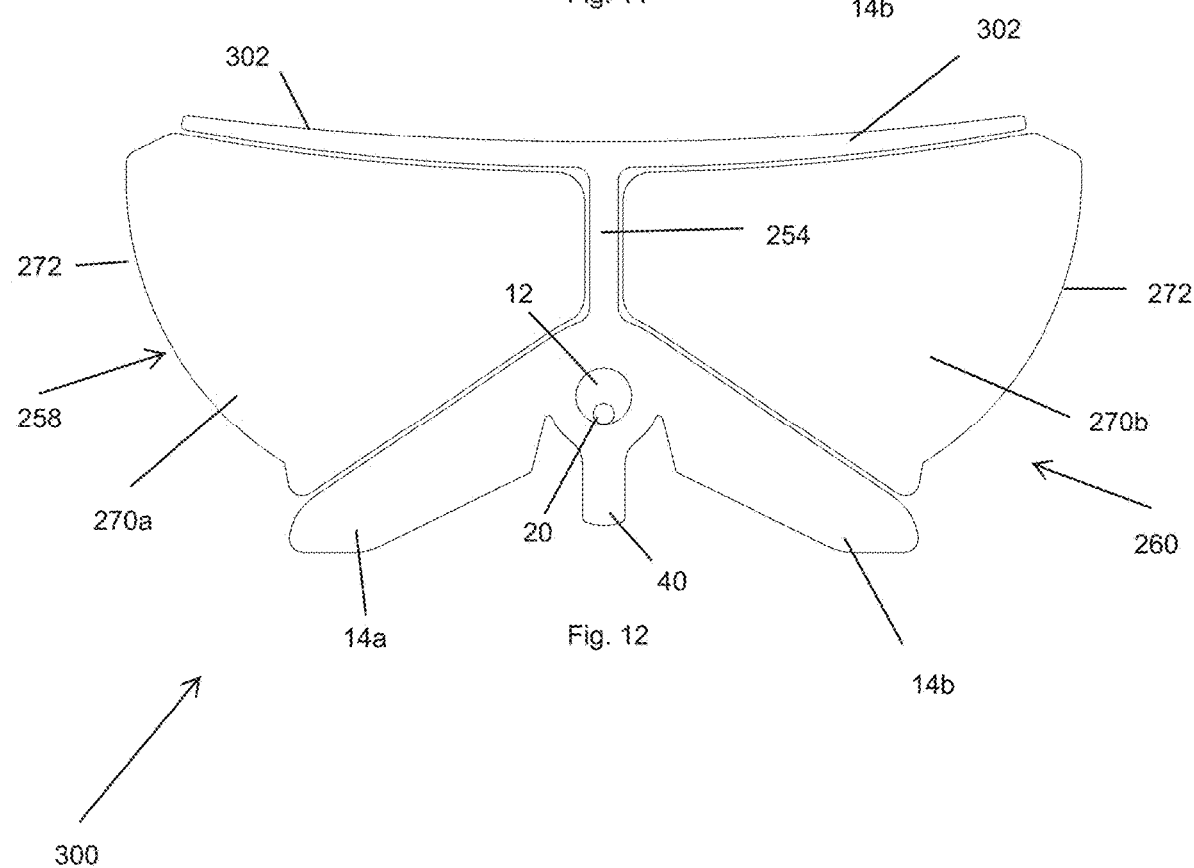

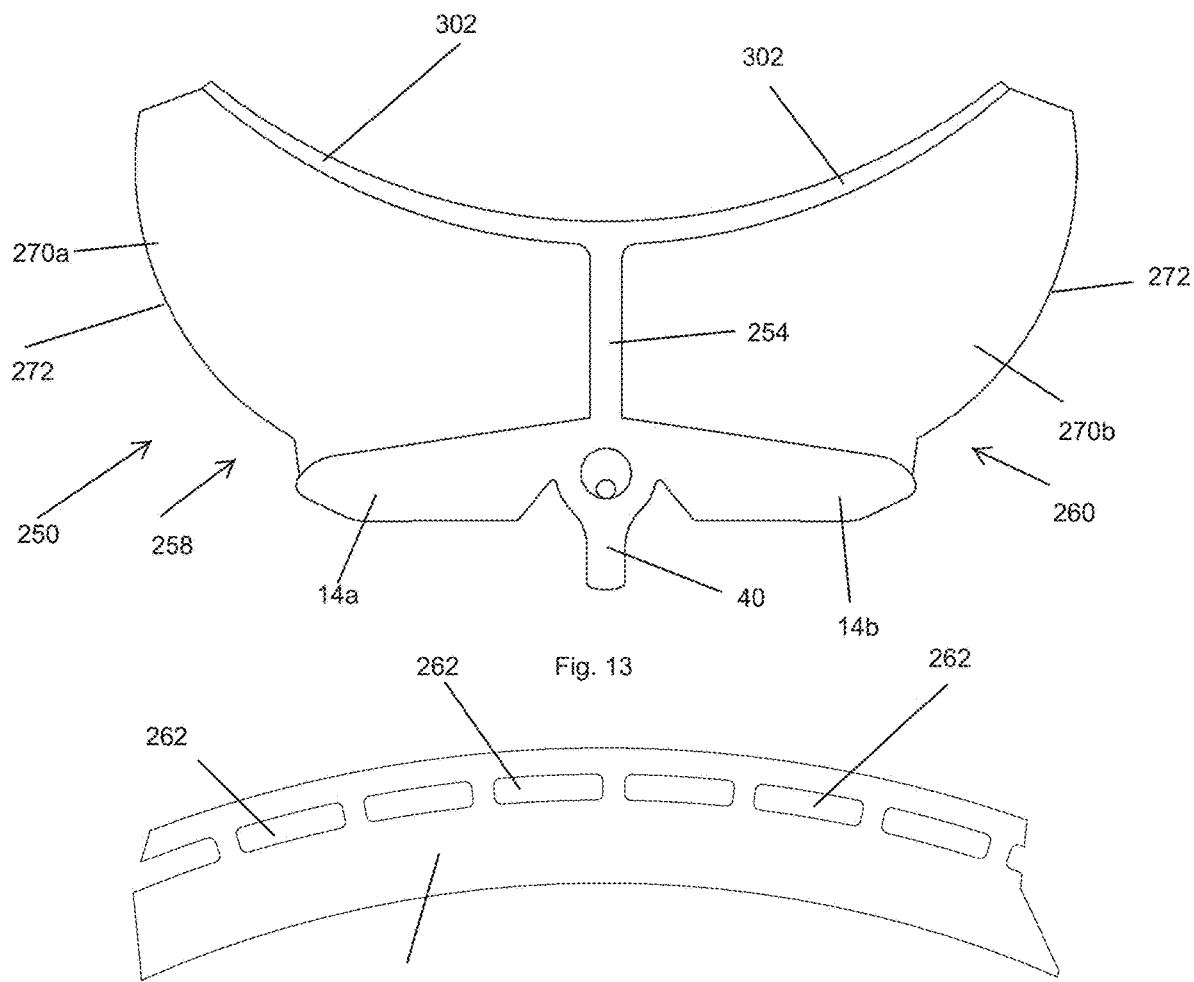

APPARATUS FOR SECURING AND SEALING A PNEUMATIC TIRE TO A WHEEL

TECHNICAL FIELD

The present invention relates generally to vehicle wheels and tires, such as the wheel and tire assembly of an automobile, motorcycle, or bicycle. More specifically, the invention describes a new apparatus and method for securing a tire to a wheel rim—in the nature of a device commonly called a bead lock. The invention is also applicable to the field of pneumatic sealing devices for tubeless tires.

BACKGROUND OF THE INVENTION

Various types of devices for securing a tire to the wheel are in use today. These devices are commonly called "bead locks." Bead locks secure the tire bead to a wheel rim, preventing the tire from rotating around the wheel when torque is applied, such as during acceleration or breaking. Bead locks also prevent the tire from coming detached from the wheel during operation, and may help preserve the integrity of the tire's pneumatic seal.

Bead locks vary in design according to the type of wheel and tire. For example, bead locks used for off-road 4×4 vehicles often clamp the tire bead area between two ring-shaped plates around the circumference of the tire bead. Alternatively, bead locks used in off-road motorcycles clamp at only one spot on the tire. These bead locks have a U-shaped cup attached to a threaded rod, which is protrudes through the wheel rim and is tightened with a nut. Tightening the nut draws the U-shaped cup down against the inside surface of the tire and clamps it against the rim flange.

These and other types of bead locks are mostly effective for their intended use. However, bead locks currently in use have drawbacks, either in their cost, their ability to hold the tire, or their tendency to unbalance the wheel. Furthermore, all bead lock designs currently in use create design limitations in other areas of the tire and wheel assembly, particularly in the area of tubeless tire sealing on spoked-wheel rims.

External bead locks, such as those used on 4×4 vehicles, require a special wheel with a bead lock system built in, adding significant complexity and expense for the vehicle owner if a bead locking system is desired. External bead locks are not used on motorcycles or bicycles.

Bead locks that secure the tire internally (such as the motorcycle bead lock described above) have drawbacks such as: (1) the tire bead is only secured to the wheel at one point, and does not secure the entire circumference of the bead, and (2) imbalance the wheel, causing wheel hopping and vibration, and (3) obstructs the use of tire and rim sealing devices, which are sometimes used to convert tube-type tires and wheels to be inflatable tubeless.

Another type of internal bead locking system currently in use for 4×4s, motorcycles, and bicycles, is composed of a high pressure bladder positioned between the tire beads and adjacent to the wheel. The bladder is inflated to force the tire beads outward against the wheel flange. With enough pressure, the outward force generated by the bladder can create an effective bead lock. This design has the added benefit of creating an airtight seal between the tire beads, which is sometimes used to enable tube-type tires and wheels to be inflated without an inner tube. A drawback to this design is the internal air bladder is susceptible to leaks and punctures. If the bladder fails, the tire must be unmounted to perform a repair.

There is a clear need therefore for improved bead locking mechanisms designed for use in all types of wheel/tire combinations. In view of the shortcomings of the known and available solutions, the present invention defines a mechanically simple and effective device for locking a tire to a rim and for defining an airtight seal between the tire and the wheel so that even a tire that is designed for use with a tube may be inflated without a tube in a tubeless fashion.

SUMMARY OF THE INVENTION

The present invention overcomes drawbacks of other bead locking systems. In particular, the invention is (1) reliable, due to a mechanical design without the need for a high pressure air bladder, (2) locks the bead around the substantial entire circumference of the wheel, (3) can be fitted to a variety of wheels, (4) maintains wheel balance by distributing weight more evenly around the wheel than a conventional motorcycle bead lock, (5) creates an airtight seal between the tire beads for people who wish to convert tube-type tires to tubeless tires.

The structure and mechanical function of the invention required to accomplish these benefits requires a significant departure from the existing bead lock designs.

The bead locking invention described herein and shown in the drawings may advantageously be used in combination with an inner-tire suspension system utilizing an annular foam insert that mounts inside a tire such as a mountain bicycle tire, as described in United States patent application publication numbers 2016/0089934 A1 and 2017/0057303 A1, published on Mar. 31, 2016 and Mar. 2, 2017, respectively, both of which are assigned to the applicant and assignee of the present application and the entire disclosures of which are incorporated herein by this reference.

BRIEF DESCRIPTION OF THE DRAWINGS

Further features and advantages of the present invention will become apparent from the following detailed description, taken in combination with the appended drawing, in which:

FIG. 3A is an axial cross sectional view of the bead lock apparatus shown in FIG. 1, shown in isolation without the rim and tire.

FIG. 3B is an axial cross sectional view of the bead lock apparatus shown in FIG. 2, shown in isolation without the rim and tire.

in FIG. 9 the bead lock apparatus is in the disengaged position.

FIG. 11 is an axial cross sectional view of a second illustrated embodiment of a bead locking mechanism according to the present invention, and more specifically, a bead locking mechanism that is configured for use with a foam damping mechanism, showing the bead locking mechanism in the unlocked position.

FIG. 12 is an axial cross sectional view of a third illustrated embodiment of a bead locking mechanism according to the present invention, and more specifically, an alternative bead locking mechanism that is configured for use with a foam damping mechanism, showing the bead locking mechanism in the unlocked position.

FIG. 13 is an axial cross sectional view of an embodiment illustrated in FIG. 12 except in FIG. 13 the bead locking mechanism is shown in the locked position.

FIG. 14 is a longitudinal (side) view of a section of the bead locking mechanism shown in FIG. 12.

DETAILED DESCRIPTION OF PREFERRED AND ILLUSTRATED EMBODIMENTS

Figure 1:
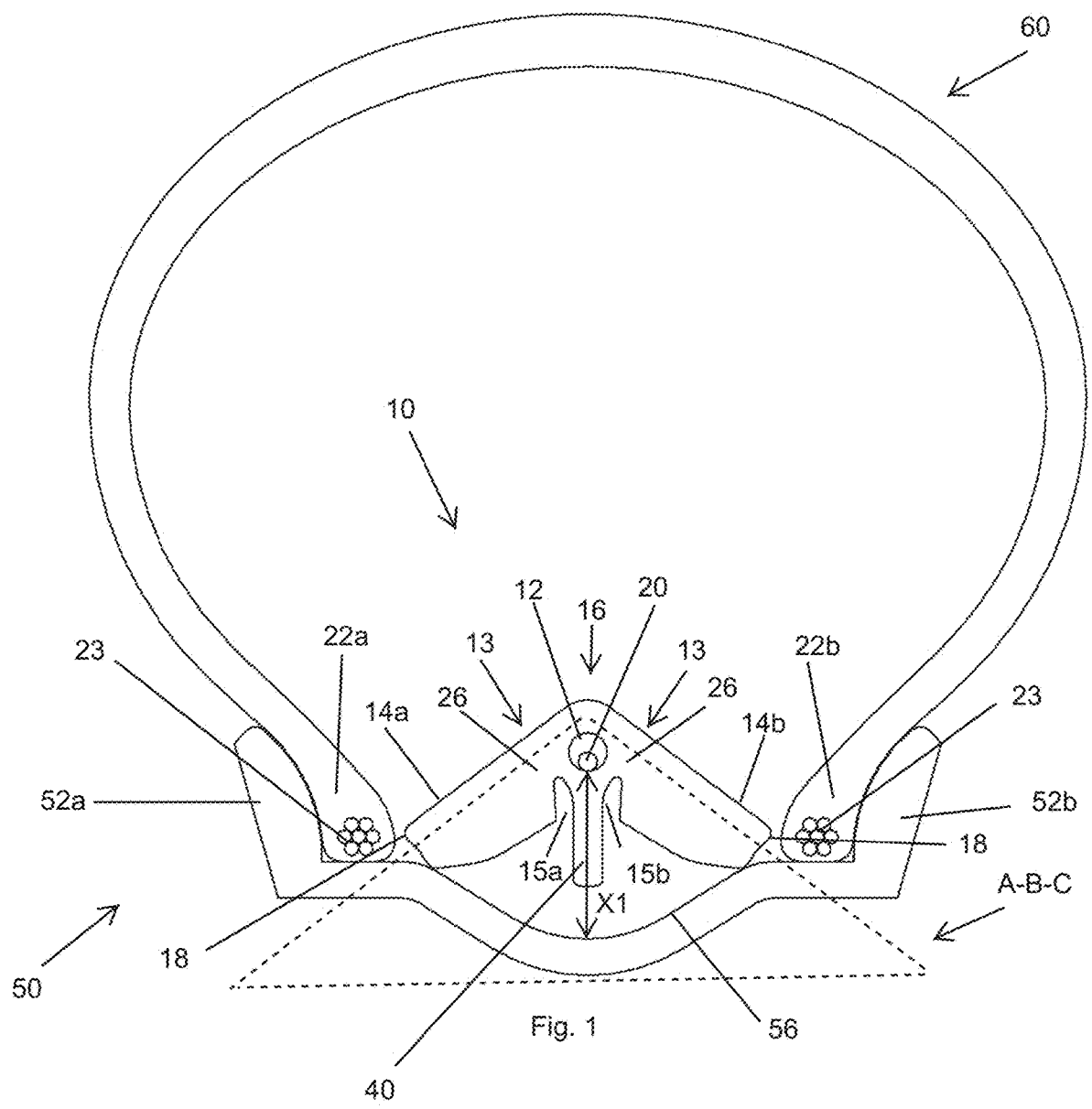
FIG. 1 is an axial cross sectional view of a first illustrated embodiment of a bead lock apparatus according to the invention, illustrating the apparatus installed on a wheel with a tire mounted on the wheel, and with the apparatus according to the invention in a relaxed or non-engaged position.

As described in detail below, the apparatus according to the invention is defined by an annular ring that extends around the interior of the wheel/rim, and the inner diameter of the annular ring is sized for a snug fit on the wheel rim. The apparatus is selectively movable between a first, disengaged or unlocked position in which the apparatus does not engage the tire and rim, and a second, engaged or locked position in which the apparatus both locks the tire to the rim and creates and/or enhances the air-tight seal between the tire and the rim. The apparatus described herein may be used with tubeless or tubed tires.

The apparatus illustrated in the drawings is at times shown in cross section but it will be understood that the invention is defined by an annular member that extends completely around the circumference of the rim and is mounted interiorly of the tire that is mounted to the rim. As a naming convention used herein, an axial view is taken from a plane that is parallel to the axis around which a wheel rotates. A longitudinal cross sectional view is taken along a plane that is perpendicular to the wheel's axis of rotation, and thus parallel to the plane in which the wheel rotates. Relative directional terms used herein follow a similar naming convention: for instance, "downward" is in vertical direction toward a ground plane, "inward" is the direction toward the interior of a structure and outward is the direction from the interior of a structure toward the exterior, etc. The same numbers are used throughout the drawings to identify same or analogous structures.

Figure 2:
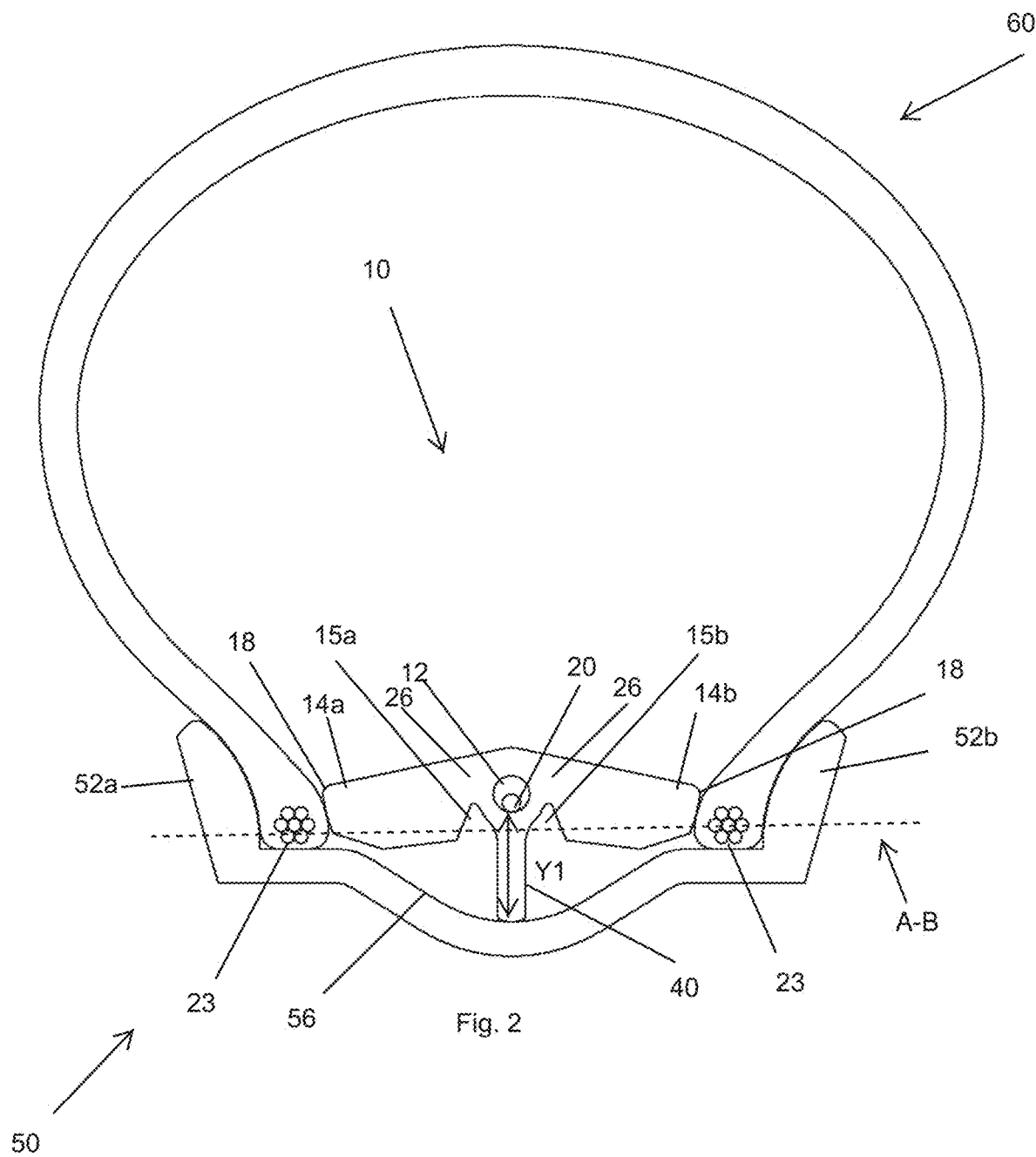
FIG. 2 is a cross sectional view of the apparatus shown in FIG. 1, illustrating the apparatus in an engaged position in which the inventive apparatus has locked the tire to the wheel and has created an airtight seal between the tire and the wheel.
Figure 4:
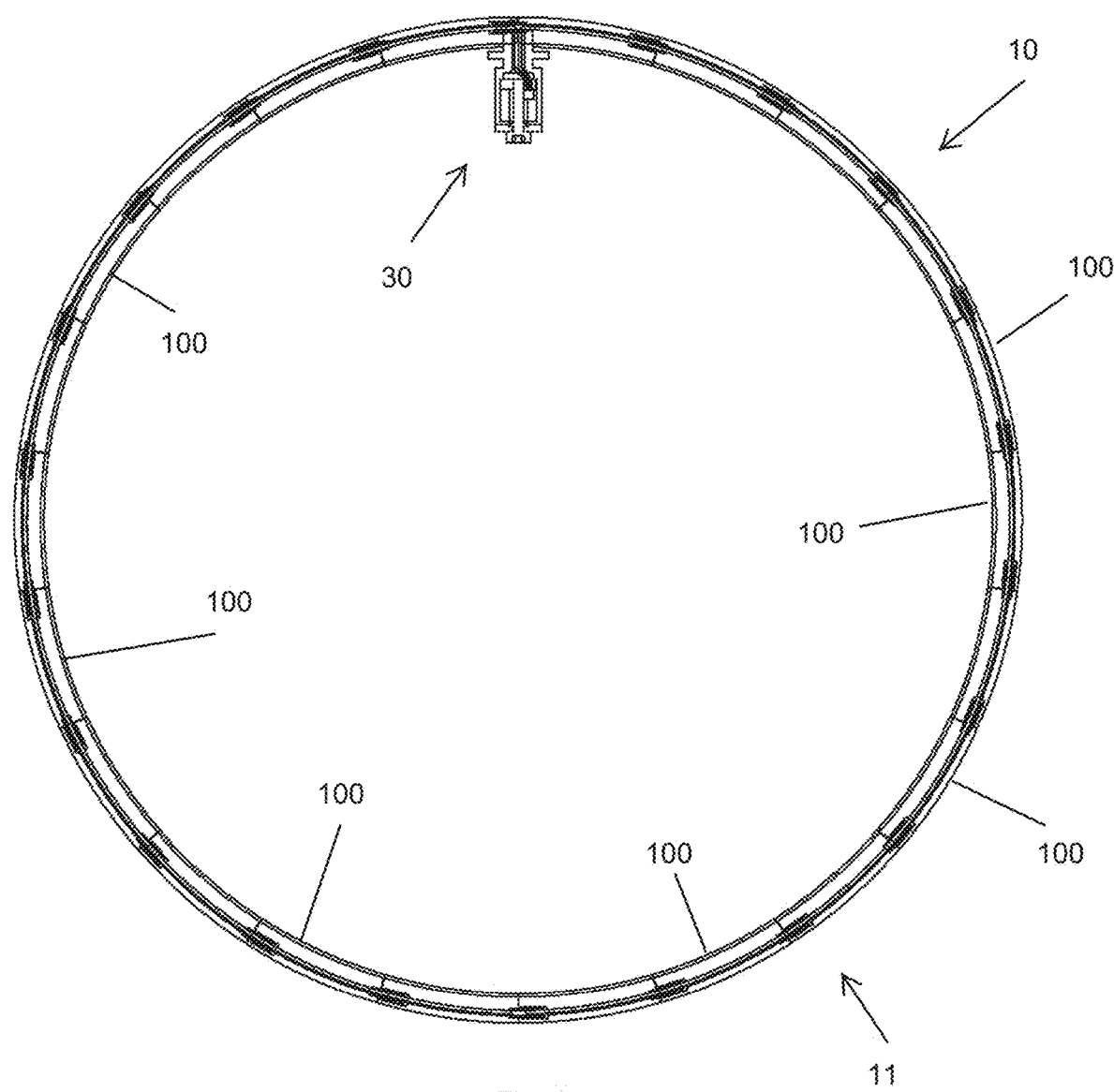
FIG. 4 is a longitudinal cross sectional view of an entire annular bead lock apparatus according to the invention, illustrating the plural radial segments, expansion joints, and cable tensioning mechanism, without the rim and tire.
Figure 5:
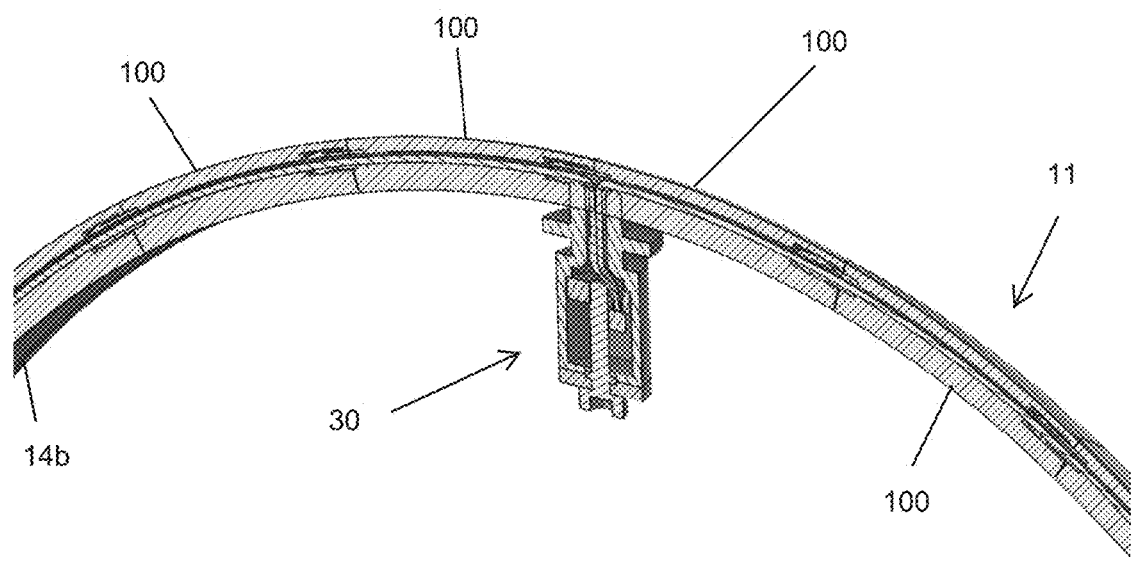
FIG. 5 is a cross sectional and perspective view of a section of the bead lock apparatus shown in FIG. 4.

With reference now to FIGS. 1 and 2, a conventional wheel 50 (also referred to as a rim 50) is illustrated with a conventional tire 60 mounted on the rim, both of which are shown in cross section—the wheel 50 and tire 60 are typical of the wheels and tires used for mountain bikes but it will be understood that the invention is not limited to use with bike wheels but may also be used with wheels for motorcycles and cars and the like. Wheel or rim 50 has opposed rim flanges 52a and 52b that define an annular tire mounting seat 54 in which the tire 60 is seated when the tire is mounted on the wheel. The tire 60 has opposed annular tire beads 22a and 22b that in the drawings of FIGS. 1 and 2 include conventional internal bead wires 23. The opposed tire beads 22a and 22b are received in the tire mounting seat 54 adjacent to the flanges 52a and 52b in a conventional manner when the tire is mounted to the rim. The lowermost interior surface of the rim 50 is identified with reference number 56. Although not shown in the figures, the wheel 50 includes conventional spokes (which may be of various types) that connect the wheel to the hub.

With continuing reference now to FIG. 1, the bead lock apparatus 10 according to the invention is shown in a first, unclamped (also referred to as an unengaged or unlocked) position. Apparatus 10 is defined by an annular ring 11 that, in the unlocked cross sectional view of FIG. 1, is generally a delta-shaped member that includes a central annular tube 12 that extends completely around the apparatus 10 to define a cable housing 16 through which a tensioning cable 20 extends. Two outwardly extending arms 14a and 14b are integrally formed with the central tube 12 to define flexible portions at the junctions 13 where the arms 14a and 14b generally join the annular tube 12 portion of apparatus 10. In the relaxed, disengaged position (FIG. 1) the arms 14a and 14*b* depart at angles from the tube 12 to form a general V-shape (the V is inverted in the view of FIG. 1). The arms 14*a* and 14*b*, also referred to herein as locking members, are integral parts of annular ring 11 and are thus annular and extend completely around the ring 11. The junctions 13 where each arm 14*a* and 14*b* is joined to the tube 12 essentially define a flexible hinge, referenced generally with 26. The hinges 26 are living hinges that are formed between the tube 12 and the arms, which are formed in a single molded piece. Advantageously, when the apparatus 10 is formed annular flex relief notches 15 are formed at the lower sides of the hinges 26 to facilitate flexing of the arms 14*a* and 14*b* at the hinges 26. The opposite, or outer ends 18 of each of the arms 14*a* and 14*b* are the part of the apparatus 10 that engage the tire and push the tire beads 22*a* and 22*b* against the flanges 52*a* and 52*b* as detailed below. As illustrated, the outer ends 18 of the arms 14*a* and 4*b* are preferably formed so that the arms ride smoothly over the facing inner surface of the rim 50 as the apparatus 10 is moved from the disengaged position shown in FIG. 1 to the engaged position shown in FIG. 2.

An annular foot 40 is integrally formed as part of apparatus 10 and extends radially downwardly from the portion of the annular ring 11 that is immediately below the tube 12. In the unengaged position of FIG. 1, foot 40 is elevated or spaced away from the interior surface 56 of rim 50 as shown. As such, in the unengaged condition of FIG. 1 the combination of the tube 12 and the two arms 14*a* and 14*b* creates a triangular profile as shown with dashed lines A-B-C in FIG. 1 that extends annularly and completely around the circumference of rim 50. In the disengaged position the outer ends 18 of arms 14*a* and 14*b* are either not in contact with the tire beads 22*a* and 22*b*, or at least are not applying pressure against the beads such that the tire would be locked to the rim. Apparatus 10 is shown in close up axial and sectional view in FIG. 3A in the unlocked position and in the locked position in FIG. 3B.

A cable 20 extends through the tube 12 completely around the circumference of the apparatus 10. In the unlocked position of FIG. 1, the distance between cable 12 and the interior surface 56 of rim 50 is shown a distance X1. As detailed below with reference to other drawing figures, at a selected point along the ring 11 the opposite ends of cable 20 exit the tube 12 and pass through a cable guide, through the wheel rim, and into a cable tensioning mechanism 30 that is mounted to the rim. The cable tensioning mechanism 30, described in detail below, enables the cable 12 to be tensioned and loosened after the apparatus 10 and tire 60 have been installed on rim 50 in order to move apparatus 10 from the disengaged to the engaged position, and vice versa.

In FIGS. 4 through 7 it may be seen that apparatus 10 comprises a joined series of radial sections 100 that are interconnected with expansion joints that in combination allow the diameter of apparatus 10 to be changed to allow the apparatus 10 to be easily installed on a rim 50 and to facilitate the bead-locking functionality. More specifically, to accommodate the change in diameter as the apparatus 10 is moved from the disengaged to the engaged positions, the annular ring 11 is defined by plural radial segments 100 that are interconnected with expansion joints but which enable crenulations or gaps 120 between adjacent interconnected radial segments 100 when the cable 20 is relatively loose, and which increase diametrical and radial flexibility of the ring 11. Because ring 11 is defined by plural radial segments 100, and each adjacent segment 100 may be separated from its adjacent segments 100 by a gap 120, the overall diameter of the ring 11 may be varied significantly to facilitate functionality of installation and operation.

Figure 6:
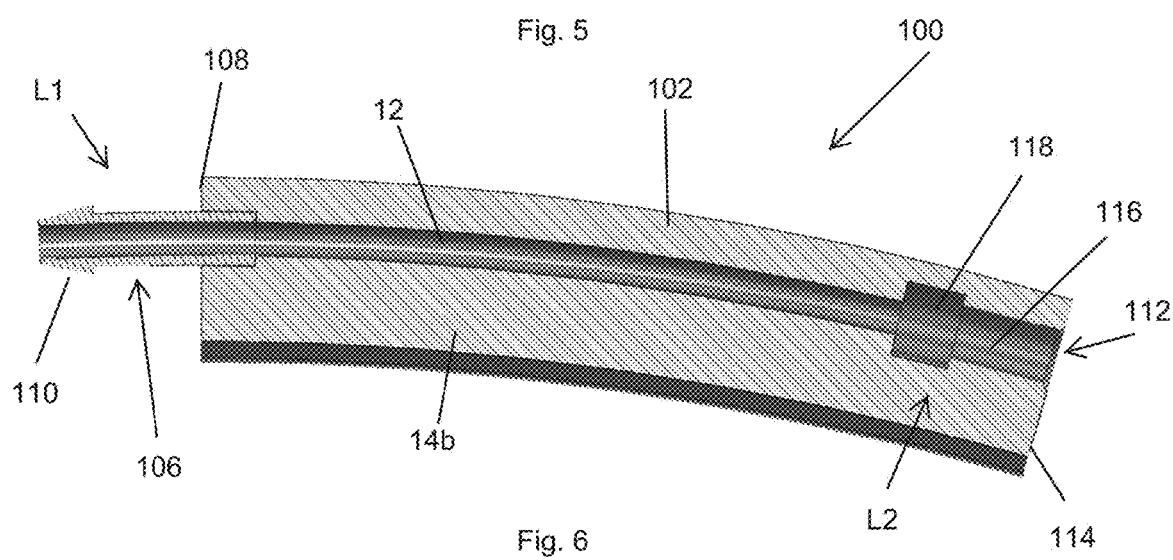
FIG. 6 is a longitudinal cross sectional view of a single radial segments and expansion joint used in the bead lock apparatus of the invention.
Figure 7:
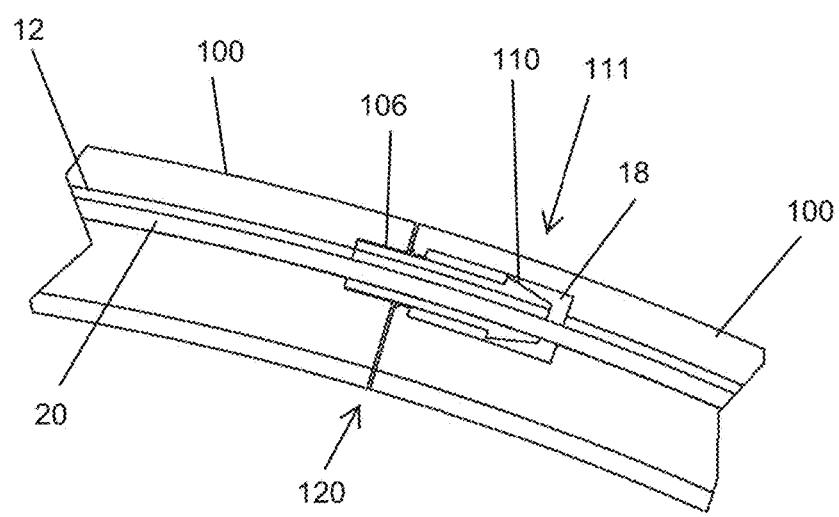
FIG. 7 is a cross sectional view of two interconnected and adjacent radial segments expansion joints according to the invention.

A single radial segment 100 is shown in isolation in FIG. 6. Each radial section 100 is defined by a main body portion 102 that includes tube 12 extending therethrough. In the cross sectional view of FIG. 6 the arm 14*b* is seen at the lower side of the body portion 102. A barbed extension 106 protrudes from a first end 108 of body portion 102 and the length between the first end 108 and the outermost tip or the barbed extension 106 is shown as L1. The cable 20-receiving tube 12 extends through barbed extension 106 and an oversized barb 110 is formed at the distal end of the extension 106. A receiving bore 112 is formed in the second end 114 of body portion 102. The diameter of bore 112 at its opening 116 is smaller than the diameter of oversized barb 110. A chamber 118 deeper inside of the bore 112 has a larger-diameter than at opening 116. The length between second end 114 and the outer edge 115 over chamber 118 is shown as L2. With reference to FIG. 7 it may be seen when two adjacent radial sections 100 are interconnected by inserting the barbed extension 106 of a first radial section 100 into the receiving bore 112 of the second radial extension. The oversized barb 110 is received in the chamber 118. The length L1 of barbed extension 106 is greater than the length L2. For purposes herein, an expansion joint 111 is defined as the interconnection between adjacent segments 100 with the barbed extension 106 extending into the receiving chamber 118 as shown in FIG. 7. Accordingly, the two interconnected radial segments 100 as shown in FIG. 7 are able to move relative to one another, to separate from one another to form a gap 120 (FIG. 7) or to move closely adjacent to one another. Adjacent radial segments 100 are thus interconnected by virtue of expansion joints 111 defined by the oversized barbs 110 being movably engaged in the chambers 100. Because there are plural radial segments 100 that form ring 11 (e.g., FIGS. 4 and 5), the overall diameter of apparatus 10 defined by ring 11 may be increased to allow installation of the apparatus on a rim 50, and during installation of the tire, then decreased to move the apparatus into the locking position.

Figure 8:
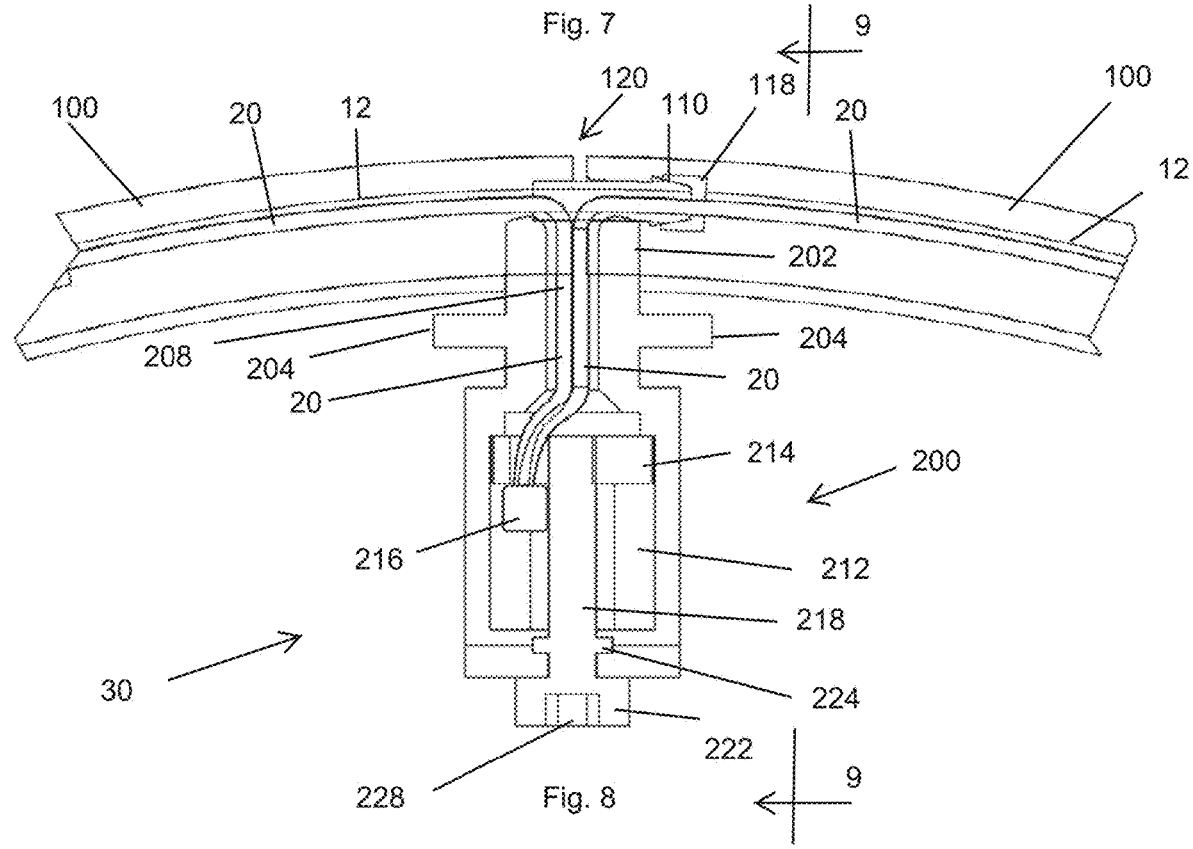
FIG. 8 is a longitudinal cross sectional view of the cable tensioner according to the invention, and illustrating two adjacent radial segments and expansion joints.
Figure 9:
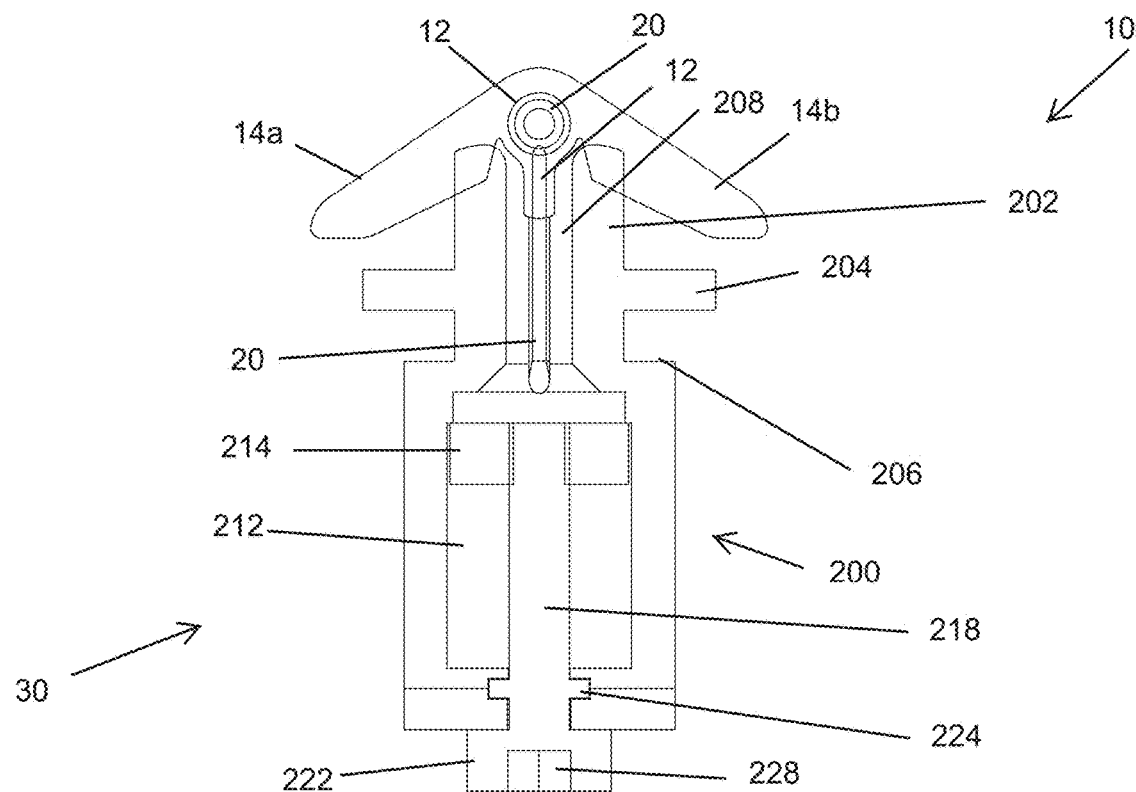
FIG. 9 is an axial and cross sectional view taken along the line 9-9 of FIG. 8.
Figure 10:
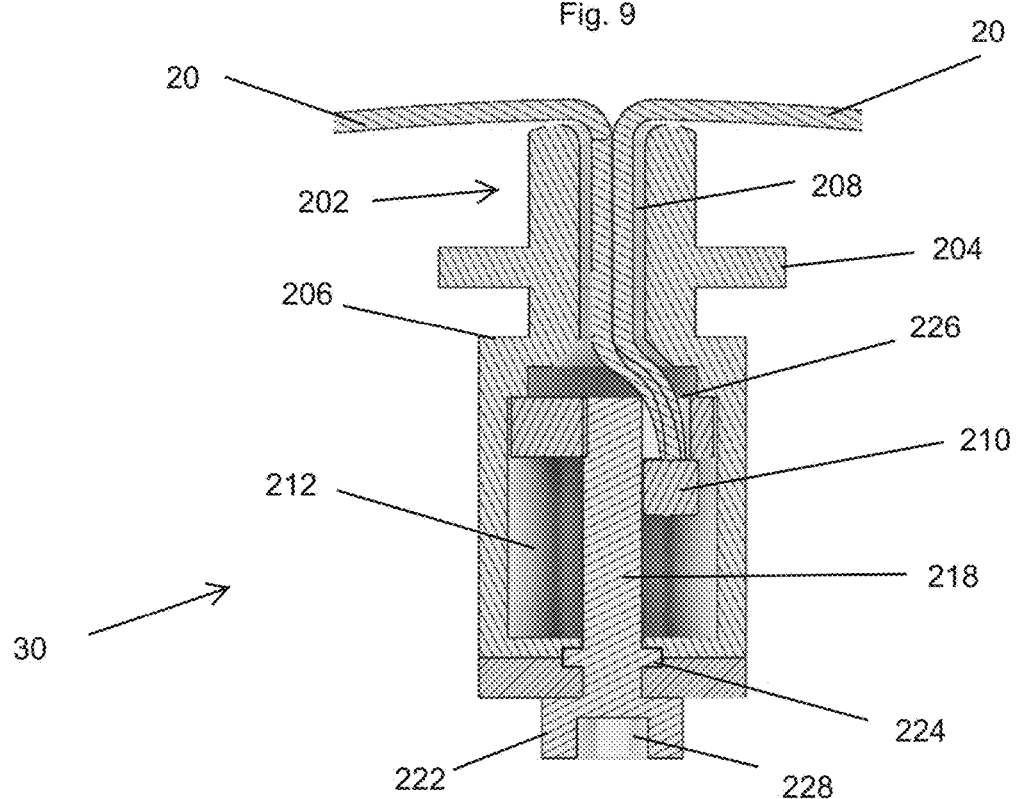
FIG. 10 is a longitudinal cross sectional view of the cable tensioner shown in isolation.

Reference is now made to FIGS. 8, 9 and 10. As noted, a cable tensioning mechanism 30 is mounted to the rim 50. Stated generally, the cable tensioning mechanism 30 enables the cable 20 to be tensioned and loosened from the inside of the wheel rim after the apparatus 10 and tire 60 have been installed on rim 50. When the cable 20 is tensioned with mechanism 30, the diameter and circumference of ring 11 is decreased. This causes the apparatus 10 to be pulled axially inwardly toward the interior surface 56 of the rim around the entire circumference of apparatus 10, thereby decreasing the distance between the cable 20 and the rim 50.

Cable tensioning mechanism 30 has a main body 200 that has a cylindrical end 202 that extends through a bore formed in the rim. When the mechanism 30 is installed on a rim 50 a cylindrical flange 204 is positioned on the interior portion of the rim and a cylindrical edge 206 is located outside of the rim so that the rim is captured between the flange 204 and the edge 206 and the inner end 202 is positioned interiorly of a tire mounted on the rim. The two opposite ends of cable 20 pass through the first open interior portion 208 of main body 200, which defines a cable guide tube, and are secured together with a lug 210 such as a swage. Adjacent the first open interior portion 208 is a second open interior portion 212 that is hexagonally configured and in which a hexagonal nut 214 is positioned. Nut 214 is internally threaded at a bore 216 and a threaded bolt 218 is threaded into bore 216 at its distal end 220. The proximate end 222 of bolt 218 is retained at the external, exposed end of main body 200 with a cylindrical retaining flange 224, where the bolt is accessible to a user. The paired ends of cable 20 are threaded through a bore 226 in nut 214—the lug 210 is oversized relative to the bore 226. The proximate end 222 of bolt 218 is preferably a hex head that a user may manipulate with a wrench, and may include a central hex key receiver 228 for ease of rotating the bolt. The lug 210 is swaged onto the paired cable 20 ends such that the lug is positioned immediately adjacent to the nut 214 and thus abutting the nut.

The tensioning mechanism is operable to apply tension to the cable 20 (i.e., to decrease the circumference of ring 11) and to loosen the tension on the cable (i.e., to increase the circumference of ring 11). The tensioning mechanism 30 is shown in the loosened position in FIG. 8—that is, with the mechanism in the position shown in FIG. 8 the length of cable 12 is at a maximum and the circumference of ring 11 is similarly at its maximum. The user turns bolt 218 to apply tension to the cable 20. Bolt 218 is fixed to main body 200 with retaining flange 224 but is axially rotatable in the main body 200. As a user rotates bolt 218 the nut 214, which as noted is threaded on to the bolt, moves along the hexagonally configured second open interior portion 212; the nut 214 cannot rotate due to the non-circular shaped of the open interior. As the nut moves along the bolt as the bolt is rotated, tension is applied to the cable since the nut pulls on lug 210 and thus pulls on both ends of the cable. Tension applied to cable 20 in this way causes the apparatus 10 to move from the unlocked position to the locked position.

Apparatus 10 is installed circumferentially around rim 50 in seat 54 with the apparatus in the relaxed state as shown in FIG. 1 and with the tensioning mechanism 30 adjusted so that the cable 20 is at its maximum length—as shown in FIG. 10. The tire 60 is installed on the wheel 50 so that the apparatus 10 is captured interiorly of the tire as shown in FIGS. 1 and 2.

Operation of the apparatus 10 to lock the beads 22a and 22b of the tire 60 to the rim 50 will now be described. With the tire 60 installed on a rim 50 with apparatus 10 installed as described and shown within the interior of the tire and in the unlocked position, tensioning mechanism 20 is manipulated by rotating bolt 218. As nut 214 reciprocates in the main body 200 as bolt 218 is rotated, the operating length of cable 20 is decreased. This causes all of the radial sections 100 to be pulled together (i.e., to eliminate all gaps 120) and causes the arms 14a and 14b, which as noted are attached to tube 12 at flexible hinge portions 26, to be forced downwardly against the interior surface of the rim 50 and simultaneously outwardly towards the interior facing surfaces of the rim flanges 52a and 52b. As the diameter of cable 20 decreases as bolt 218 is rotated and the cable is thereby tensioned, the outer ends 18 of the arms slide over the interior surface of the rim 50 until the outer ends 18 of the arms 14a and 14b abut the tire beads 22a and 22b and press the tire bead against the interior-facing surfaces of the rim flanges 52a and 52b. The outwardly directed pressure from the arms bearing against the tire beads 22a and 22b effectively clamps the apparatus 10 in the engaged position of FIG. 2 and in this position the two arms are essentially longitudinally aligned with one another as shown by the linear line A-B shown in dashed lines in FIG. 2. In this position the distal end of annular foot 40 abuts the interior surface 56 of rim 50. The decrease in the circumference of ring 11 is illustrated by the length Y1 shown in FIG. 1—the distance between cable 20 and the interior surface 56. The length X1>Y1.

The combined leverage of the tensioning mechanism 30 plus the wedge-action of the clamping mechanism generates significant bead clamping force and locks the bead to the rim flange around the entire circumference of the wheel. Because the outer ends 18 of both arms 14a and 14b are pressing the beads 22a and 22b against the adjacent rim flanges 52a and 52b over the entire circumference of the rim flanges, the tire is retained very securely against the rim. Even when significant rotational torque is applied to the wheel (as for example with a motorcycle that is applying power to the rear wheel) the tire remains locked in place relative to the rim. It will be appreciated that in the engaged position any gaps 120 between adjacent radial segments 100 are closed so that the apparatus 10 applies bead-locking force over substantially the entire circumference of the tire and rim.

It is also possible to use the apparatus described herein in a way that includes spacing or gaps between radial segments. Even a single short segment may be used to apply sufficient bead-locking force to adequately lock the tire to the rim. As an example of this concept, it would be possible to intersperse modified radial segments that do not include arms 14a and 14b between the arms as detailed above that do include the arm, or to use a modified bead locking apparatus of the type illustrated in FIGS. 19A and 19B and as described below.

Figure 15:
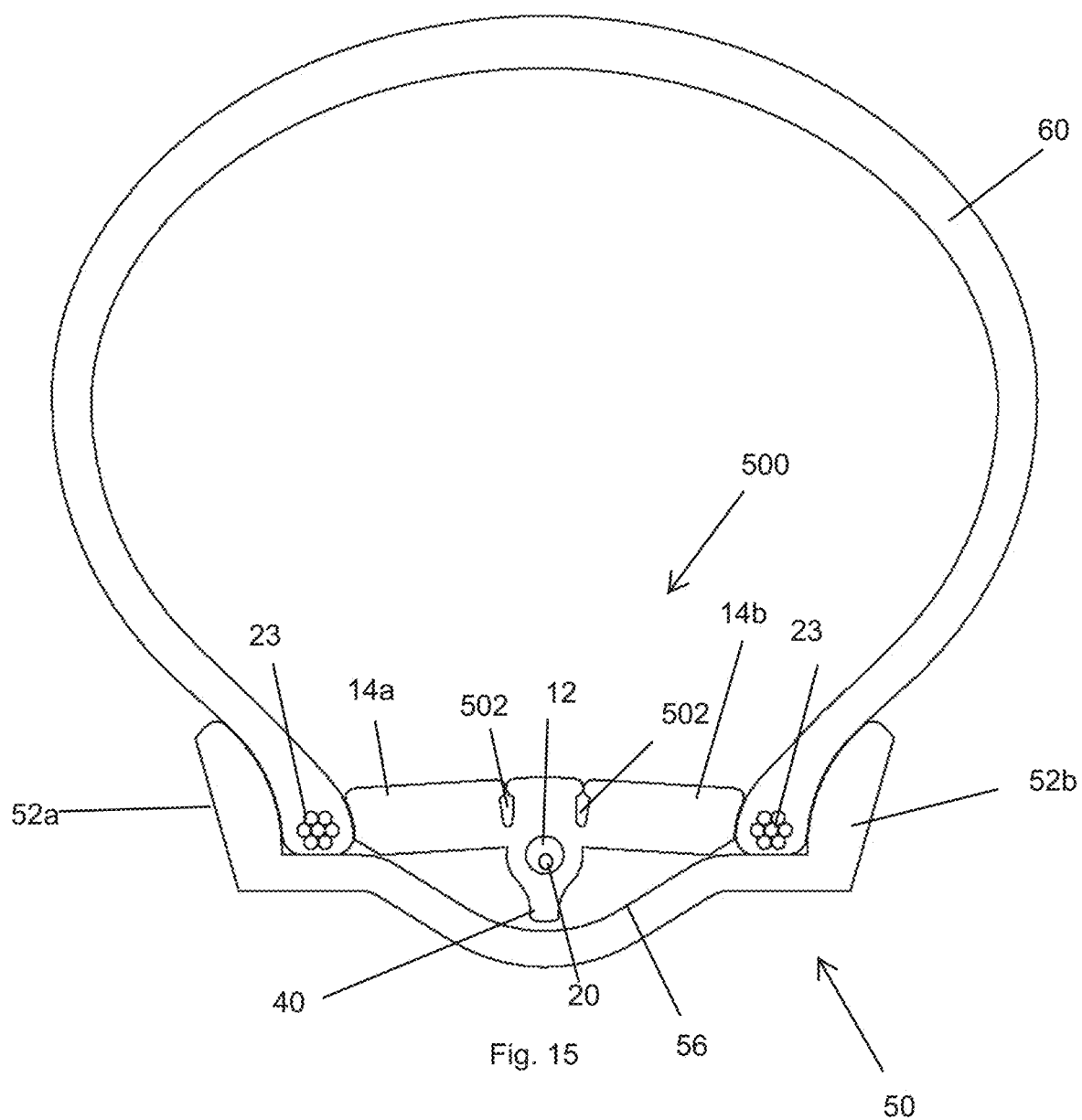
FIG. 15 an axial cross sectional view of yet another alternative embodiment of a bead lock apparatus according to the invention, shown in the locked position analogous to FIG. 2, above.

It will be appreciated that the two arms 14a and 14b define in the locked position of FIG. 2 a clamping mechanism that applies sufficient pressure to the tire beads to define the bead locking mechanism. The profile of the device may be designed around the desire clamp fulcrum position. To a significant extent, the fulcrum point determines the behavior of the clamping mechanism. One alternate example is illustrated in FIG. 15, which can self-lock in the engaged position by means of an over-center type cam design.

It will further be appreciated that there are several functionally equivalent structures for tensioning mechanism 30 that may be used to apply tension to cable 12. For example, a ratchet type mechanism may be used to prevent bolt 218 from loosening after the cable has been tensioned. Other mechanisms for tensioning/loosening cable 20 include a cam lever mounted to the surface of the rim that faces the hub, similar to a quick-release skewer used to secure bike wheels to the forks. In addition, a locking spool or reel may be used to wind in the cable and maintain it under tension. Prior to unmounting a tire, a button may be pressed to disengage the locking mechanism and thereby release cable tension.

As another aspect of the invention, the apparatus 10 creates an airtight seal between the tire beads, which makes it possible to inflate a tube-type wheel and tire without an inner tube. Furthermore, spoked wheels, or other wheels lacking airtight rims, may be used without inner tubes since the device entirely excludes the wheel rim from the sealed air chamber. Thus, the living hinges 26 do not allow air to pass and when the apparatus 10 is in the engaged, locked position of FIG. 2, no air can pass from the interior of the tire 60 through apparatus 10. It is commonly acknowledged that tubeless tires offer advantages over tube-type tires, such as greater reliability, reduced heat buildup, easier repairs, and improved bump sensitivity. The invention enables these benefits to be applied to vehicle tires normally limited to inner tubes.

The tire sealing device defined by apparatus 10 shares its basic structure with the bead locking apparatus 10 described above. However, the device must be constructed from a seamless and airtight material, without holes or gaps where air could escape. Alternatively, a layer of airtight material may be attached to the device to accomplish the air seal where holes or gaps in the mechanical structure would otherwise prevent sealing.

An air valve (not shown) may also be incorporated, which is particularly useful for tubeless applications. The air valve connects the sealed air chamber within the tire to an accessible spot on the inside surface of the rim, so that the tire can be inflated and deflated when the device is in its clamped and locked position. A valve port passes through the center of the structure, and is constructed with an air seal between the valve body and the valve port, such that the device may be clamped and unclamped without compromising the air seal. The tensioning cable pathway deviates around the air valve hole, so neither the cable nor the air valve is obstructed by the other.

Various alternative embodiments of a bead locking apparatus according to the invention are shown in FIGS. 11 through 18. Each of the embodiments shown in these figures is adapted to be used with the foam inserts that are described in United States patent application publication numbers 2016/0089934 A1 and 2017/0057303 A1, the disclosures of which are incorporated herein. Beginning with the embodiment of FIG. 11, the bead locking apparatus 250 includes a main body portion 252 that is substantially alike the apparatus 10 described above with respect to FIG. 1, but which further includes an annular T-shaped extension that is formed integrally with the main body portion and which is defined by an upright central column 254 that is connected with an upper, generally horizontal member 256. This T-shaped extension forms paired annular channels 258 and 260 on opposite sides of the central column 254 and between the horizontal member 256. An annular foam insert 270, which is the type described in the patent publications described above, modified as described below, is inserted into and retained in the annular channels 258.

Turning to FIG. 14, a portion of bead locking apparatus 250 is shown in side view and includes plural openings or fenestrations 262 that are formed in the central column 254. The annular foam insert 270 may be attached in the annular channels in several different manners. A first exemplary method is to form the annular foam insert in two annular pieces, shown as 270a and 270b in FIG. 11 and each of the two pieces are attached to the channels 258 and 260, respectively, of apparatus 250 with extensions that are press-fitted into the openings 262, or otherwise attached in the annular channels 258 and 260 such that the horizontal member 256 overlies the upper side of the foam as shown in FIG. 11. The foam pieces 270a and 270b could similarly be secured in the channels 258 and 260 with adhesives or with fasteners. When the apparatus of FIG. 11 is mounted to a rim 50 and a tire 60 is mounted to the rim, the interior sidewalls of the tires abut the facing exterior walls 272 of the foam pieces 270a and 270b and a void is formed in the tire interior above the horizontal member 256 and below the tire (in some embodiments or installations an air bladder—a tube—may be used in the void). The horizontal member 256 performs several functions, including acting as a shield that distributes impact force over a greater area of the foam, holding the foam pieces in position if they are molded in segmented blocks as opposed to a continuous ring (see below), and to facilitate the necessary radial and/or lateral tension on the foam pieces to provide support for the tire sidewalls—i.e., to improve lateral stability of the tire. Alternative methods of installing the foam inserts 270 with apparatus according to the invention are described below.

The embodiment of a bead locking apparatus 300 shown in FIGS. 12 and 13 is similar to that shown in FIG. 11 and is adapted with a T-shaped extension for use with the described annular inserts. However, in the embodiment of FIGS. 12 and 13 the horizontal member 302 is fabricated to be relatively more flexible than the horizontal member 256 of FIG. 11 and such that it acts as a spring-like mechanism that compresses the annular foam pieces 270a and 270b when the locking apparatus is in the locked position (FIG. 13). This compression of the foam presses the foam outwardly against the abutting interior sidewalls of the tire, which increases the lateral stability of the tire while tending to decrease the amount of foam that is used for the inserts 270. In FIG. 13 it may also be seen that the horizontal member 302 is cupped—concave in the direction of the axis of the wheel—when the locking apparatus is in the locked position.

Figure 16A:
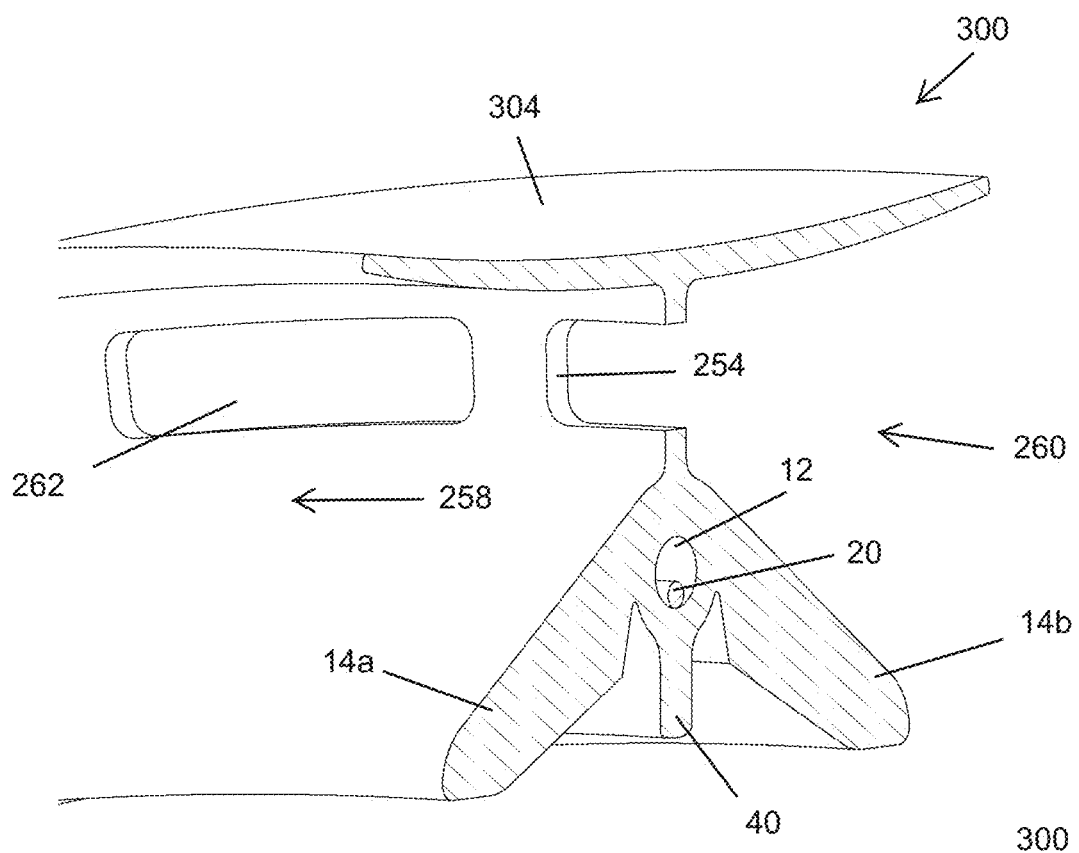
FIG. 16A is a perspective and axial cross sectional view of the bead locking apparatus of FIG. 13, showing the apparatus in the disengaged position.
Figure 16B:
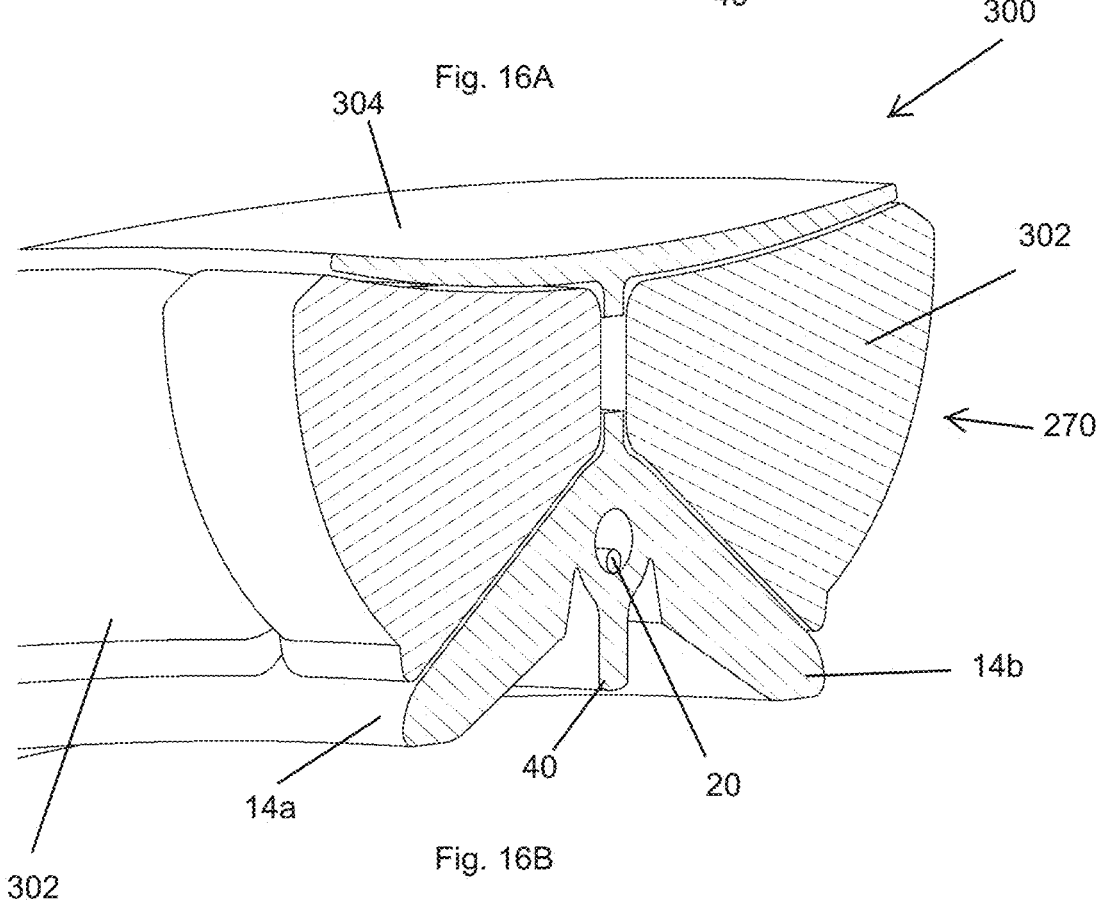
FIG. 16B is a perspective and axial cross sectional view of the bead locking apparatus of FIG. 16A, showing the apparatus in the disengaged position and with segments of foam blocks inserted into the apparatus.

FIGS. 16A and 16B together illustrate an alternative embodiment of apparatus 300 in which the openings 262 are formed in the upright central column 254 (FIG. 16A) and the foam insert 270 is defined by a series of segments or blocks of foam 302 are inserted through the openings to secure the foam in the channels 258 and 260—the channels are bounded by the uprising central column 254 and the horizontal member 304. To insert a segment of foam block 302 into an opening 262 the foam is compressed and the block is pushed through the opening until the correct position is achieved.

Figure 17A:
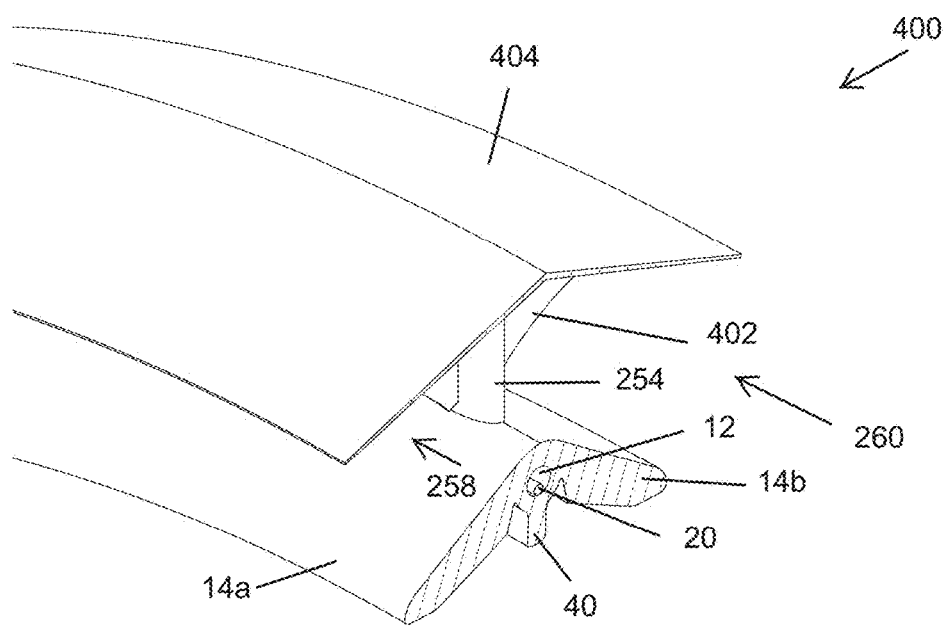
FIG. 17A is a perspective and axial cross sectional view of the bead locking apparatus of FIG. 11, showing the apparatus in the disengaged position and showing the apparatus from the top side.
Figure 17B:
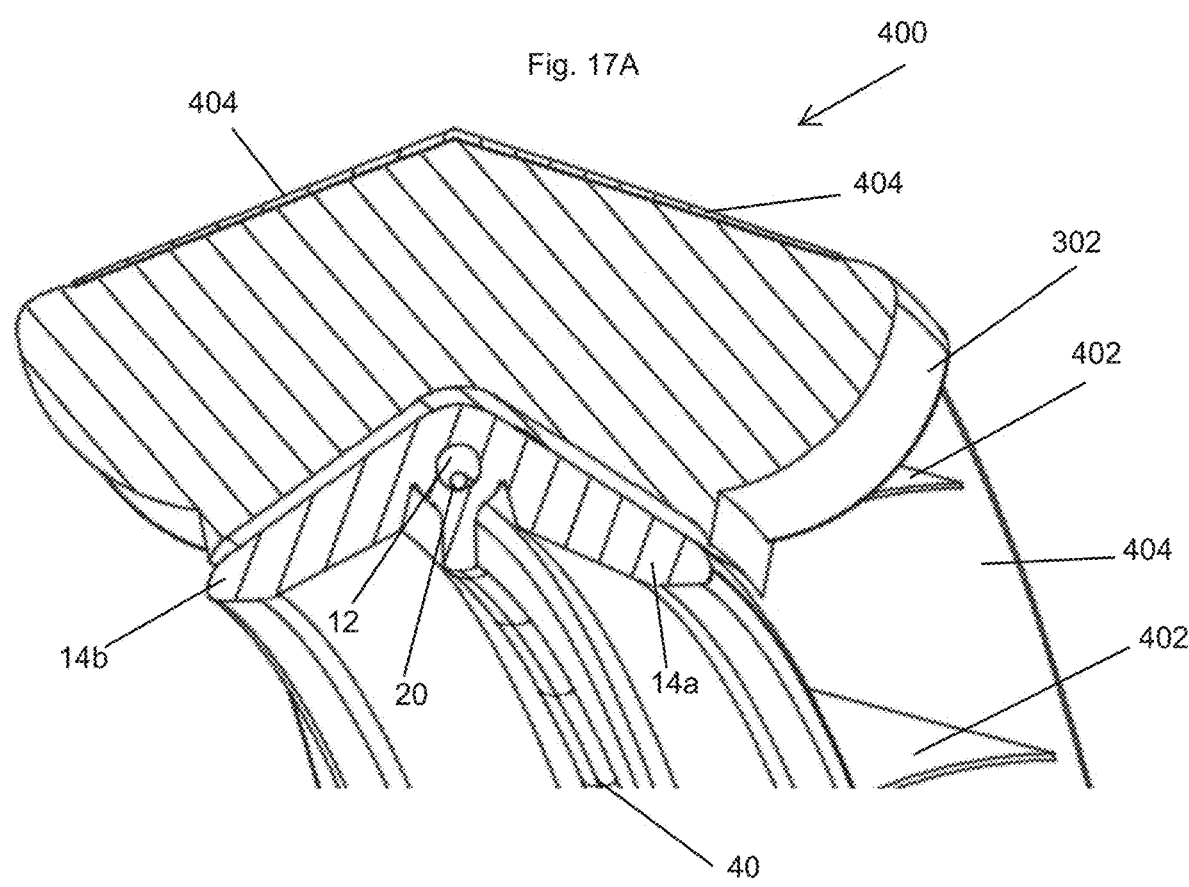
FIG. 17B is a perspective and axial cross sectional view of the bead locking apparatus of FIG. 17A, showing the apparatus in the disengaged position and with a single segment of foam inserted into the apparatus, showing the apparatus from the bottom side.

The paired drawings of FIGS. 17A and 17B illustrate yet another alternative embodiment 400 wherein the foam inserts are again defined by segmented blocks 302—as with the embodiment of FIGS. 16A and 16B, in FIG. 17B the foam blocks 302 are compressed and pushed through openings 262 where they are retained. In the embodiment of FIGS. 17A and 17B there are supporting struts 402 extending from the central column 254 to the horizontal member 404. The supporting struts help to secure the foam blocks 302 in the channels 258 and 260 and to at least partially compress the foam.

Figure 18A:
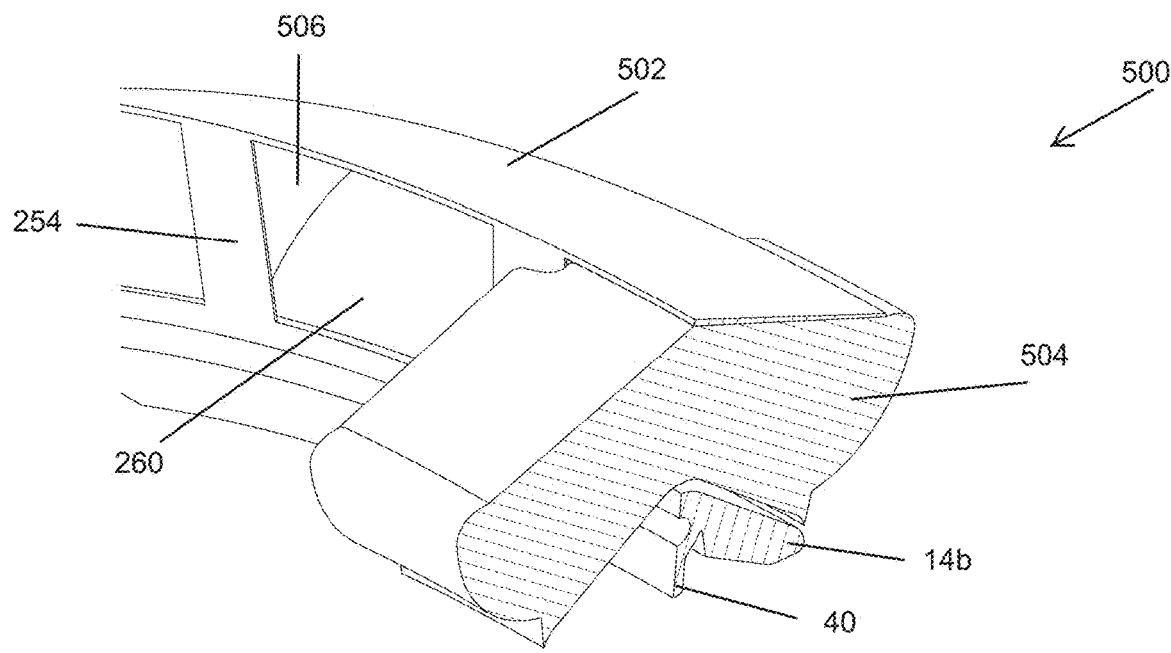
FIG. 18A is a perspective fragmentary view of an alternative embodiment of a bead locking apparatus according to the invention, with a portion of the horizontal member removed to illustrate a segmented foam block installed in the bead locking mechanism.
Figure 18B:
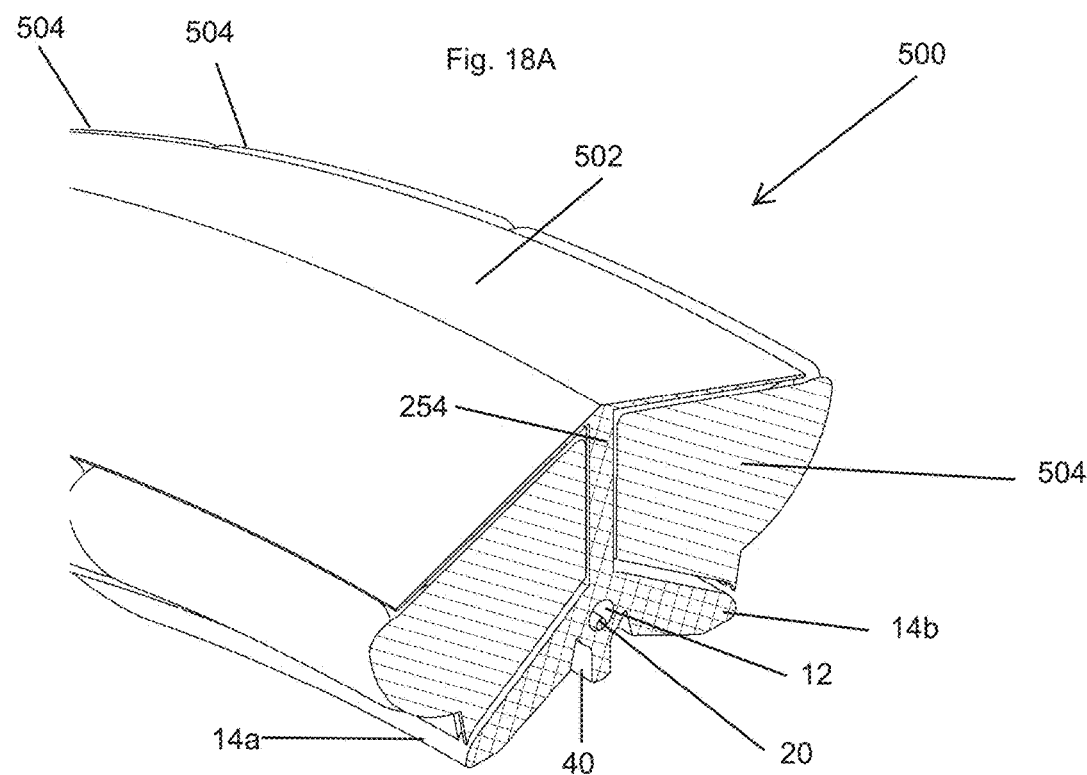
FIG. 18B is a perspective view of the apparatus shown in FIG. 18A with the horizontal member in place.
Figure 18C:
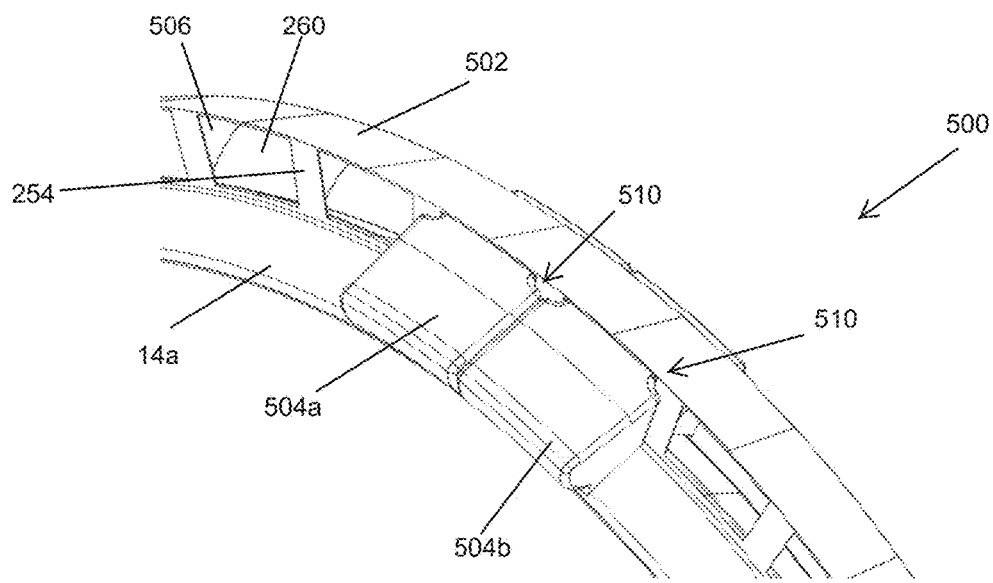
FIG. 18C is a perspective fragmentary view of the apparatus shown in FIG. 18A with two segmented foam blocks installed in the bead locking mechanism.

The series of illustrations of FIGS. 18A, 18B and 18C illustrate different views of the embodiments shown in FIGS. 11, 17A and 17B (in FIGS. 18A and 18C the near side portion of horizontal member 502 and near side arm 14a are removed for clarity of illustrating the foam block(s) 504). Like the embodiment of FIG. 17, the embodiment of FIG. 18 includes support struts 506 that extend between the central column 254 and the horizontal member 502. It may be seen in FIG. 18C that the center portion of each of the segmented foam blocks 504 is formed with a waist 510 that defines a reduced circumference to facilitate insertion and retention of the blocks 504 in the openings 260 and so that adjacent blocks fit relatively tightly against one another (as shown with blocks 504a and 504b).

It will be appreciated that plural segmented foam blocks are utilized in the embodiments illustrated in FIGS. 16, 17 and 18 to form a foam insert that extends completely around the circumference of the bead locking apparatus, one segmented foam block for each opening 262.

With returning reference now to the embodiment of FIG. 15, an alternative embodiment of a bead lock apparatus 500 is illustrated and is shown with the apparatus installed in on a rim 50 with a tire 60—the apparatus is in the locked position. The apparatus 500 is analogous to apparatus 10 shown in FIG. 1 but is embodied as a "over-center cam design" in which the flex relief notches 502 are positioned on the opposite side of arms 14a and 14b relative to the embodiment of FIG. 1. The apparatus 500 includes a cable 20, but the cable is omitted from FIG. 15 for the purposes of clarity.

Apparatus 500 is defined by an annular ring 11. In the locked cross sectional view of FIG. 15 the arms 14a and 14b are generally horizontally extending such that they bear against the tire beads to lock the tire against the rim. The apparatus 500 includes generally the same structures as apparatus 100 described above, but the central annular tube 12 is positioned lower relative to the rim structures and such that in the locked position of FIG. 15 the diameter of the tube 12 is smaller than the diameter of the contact points between arms 14a and 14b and the tire. The two outwardly extending arms 14a and 14b are integrally formed with the central tube 12 as described above to define flexible portions at the junctions 13 where the arms 14a and 14b join to the tube. Advantageously, when the apparatus 500 is in the locked position shown in FIG. 15 the over-center cam design locks in place with little or no tension in the cable 20. It will be appreciated that in an unlocked position (not shown) the embodiment of apparatus 500 shown in FIG. 15 defines a triangle analogous to triangle A-B-C that is inverted relative to that shown in FIG. 1.

Plastic materials may be used for the bead locking apparatuses described herein and the type of plastic used, its flexural and hardness characteristics, and the thickness of the parts may be varied according to the desired functionality. For instance, with the spring like horizontal member 302 of FIG. 12 the member is formed in a manner intended to enhance its flexibility.

Figures 19A, 19B:
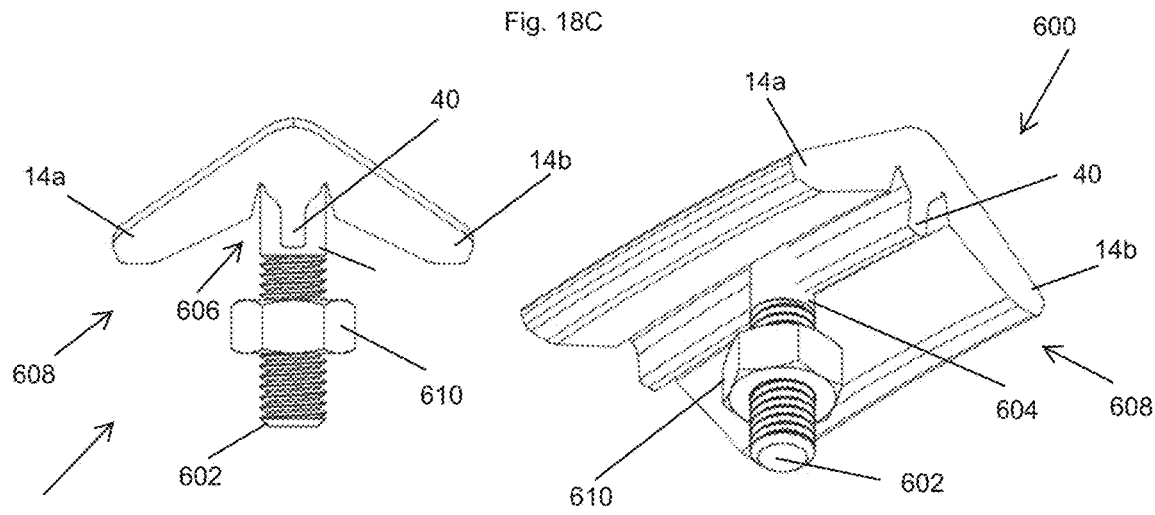
FIG. 19A is an axial cross sectional view of an alternative embodiment of a bead locking apparatus according to the invention illustrating an alternative tensioning mechanism, illustrating the embodiment in the disengaged position.
FIG. 19B is a lower perspective view of a section of the apparatus shown in FIG. 19A.

An alternative embodiment of a bead locking apparatus 600 is shown in FIGS. 19A and 19B in which the tensioning means described above by cable 20 and tensioner 30 are replaced by a bolt 602 that has one end 604 attached to the lower central portion 606 of annular bead locking member 608, for example by molding the bolt to the bead locking member. The bolt 602 is designed to extend through a bore in wheel 50 and a nut 610 is threaded onto the bolt externally of the wheel. To move the arms 14a and 14b from the disengaged position illustrated in the drawings to the engaged position (not shown) the nut is tightened against the wheel, thereby drawing the foot 40 axially inwardly until foot 40 abuts the inner surface of the wheel and arms 14a and 14b engage the tire beads and lock the tire against the wheel flanges. The bead lock apparatus 600 of FIG. 19A is a stand-alone unit: only one apparatus 600 is required to sufficiently lock the tire to the rim. At least in the case where the apparatus 600 is used with a motorcycle wheel, the bolt 602 extends through a pre-drilled bore in the wheel that is intended for use with a bead locking device.

Figure 20A:
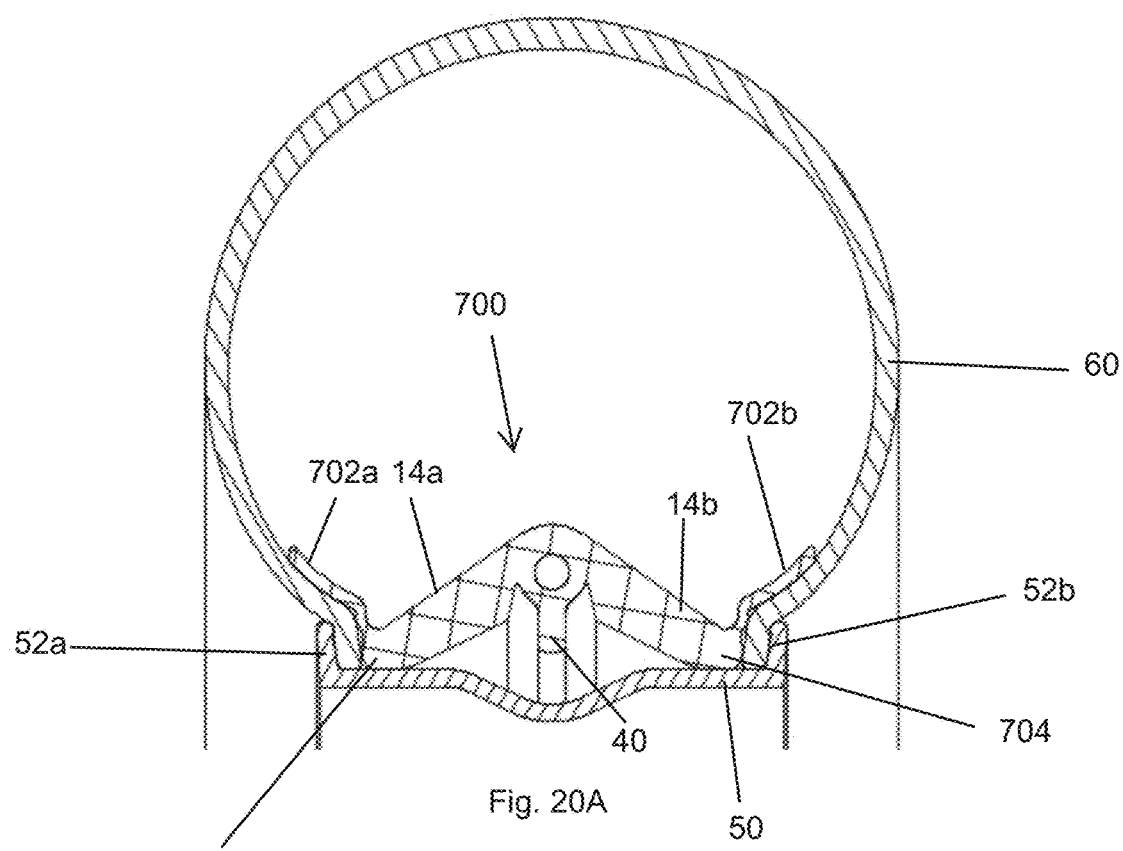
FIG. 20A is an axial cross sectional view of another alternative embodiment of a bead locking apparatus according to the invention.
Figure 20B:
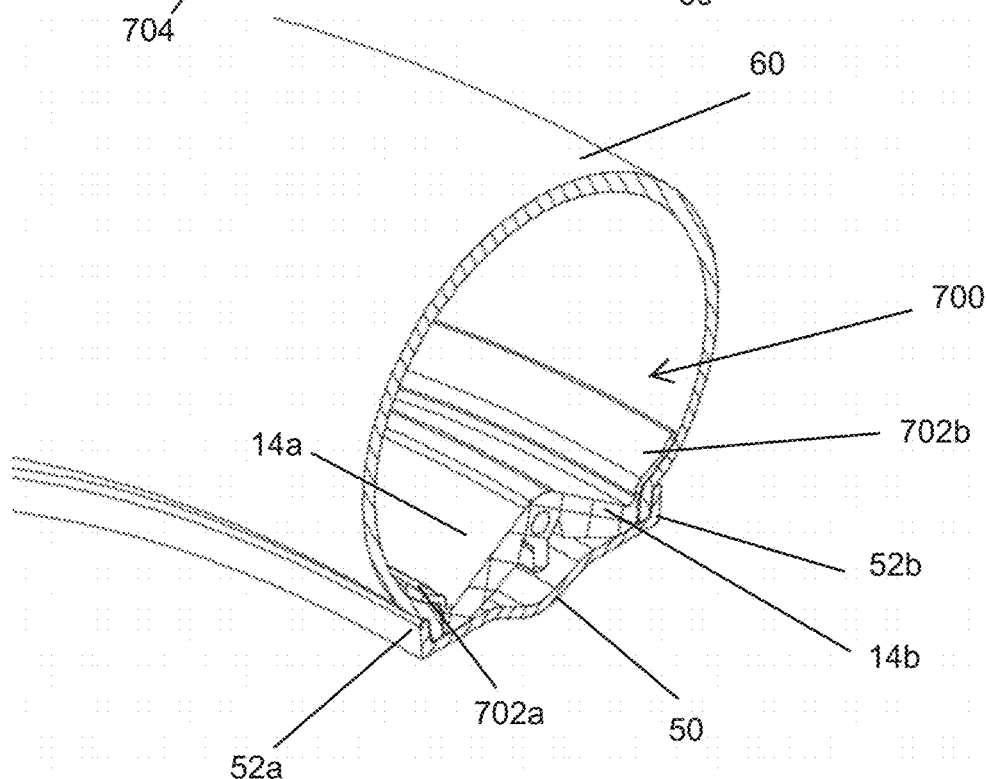
FIG. 20B is a perspective and sectional view of the embodiment shown in FIG. 20A.

FIGS. 20A and 20B illustrate yet another embodiment of a bead locking apparatus 700 according to the invention. In this embodiment a protective rim shield 702 is formed on the outer (distal) ends 704 of each of the arms 14a and 14b (thus, rim shields 702a and 702b). When the apparatus 700 is in the engaged position illustrated in FIGS. 20A and 20B the rim shields 702 conform to the interior of the tire casing over the tire beads. The embodiment of FIGS. 20A and 20B utilizes a tensioning mechanism of the type described above with a cable and tensioner, although the components of the tensioning mechanism are not shown for purposes of clarity.

The rim shields 702 are designed to reduce damage to wheel and tire components during impact with sharp obstacles the wheel comes into contact with. In off-road riding, the tire will often deflect enough to contact the rim, which causes "snakebite" flats with inner tubes and can cut the tire casing in a tubeless application. Such compression can also cut the foam of a foam insert of the type described herein. The hard plastic shield distributes the impact energy over a broader area, reducing the likelihood of damage.

In yet another aspect of the invention, both bead locking and tire sealing capabilities are combined into a single device. This embodiment encompasses all features of the separate and independent embodiments, combining them into a single device that accomplishes both functions.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. Apparatus for locking a tire mounted to a rim wherein the rim has a tire-mounting seat between opposed rim flanges with a rim interior surface in the tire-mounting seat, and the tire has opposed tire beads, comprising:

an annular tubular member adapted for extending circumferentially around the rim;
a tensionable cable extending circumferentially through the annular tubular member;
first and second arms attached to the annular tubular member, each arm extending circumferentially around the annular tubular member and each arm having an outer end;
wherein the annular tubular member is selectively movable by tensioning the cable between a disengaged position in which the annular tubular member is spaced apart from the rim interior surface by a distance X and an engaged position in which the annular tubular member is spaced apart from the rim interior surface by a distance Y, where X >Y; and
wherein in the engaged position the outer ends of the arms bear against respective tire beads to apply pressure thereto.

2. Apparatus according to claim 1 in which when the annular tubular member is in the disengaged position the first and second arms do not apply enough pressure to the tire beads to lock the tire to the rim.

3. Apparatus according to claim 1 wherein when the annular tubular member is in the engaged position the tire is locked to the rim.

4. Apparatus according to claim 3 including an annular foot having a distal end that is adapted to contact the rim interior surface when the annular tubular member is in the engaged position.

5. Apparatus according to claim 4 in which the annular tubular member is defined by plural segments.

6. Apparatus according to claim 5 in which each of the plural segments is interconnected to adjacent segments with an expansion joint.

7. Apparatus according to claim 1 including a tensioner for selectively increasing and decreasing tension on the cable.

8. Apparatus according to claim 7 in which the cable has opposite ends that extend into an interior bore in the tensioner and are connected to a nut in the interior bore, and wherein tension is applied to the cable by rotating a bolt to cause the nut to slide in the interior bore.

9. Apparatus according to claim 1 in which each of the first and second arms are attached to the annular tubular member with a living hinge.

10. Apparatus according to claim 1 further comprising a T-shaped extension extending from the annular tubular member to define first and second annular channels, wherein the channels are at least partially bounded by an upright column, a horizontal member and the annular tubular member.

11. Apparatus according to claim 10 including a foam insert in each of the first and second annular channels.

12. Apparatus for locking a tire mounted to a rim wherein the rim has a tire-mounting seat between opposed rim flanges with a rim interior surface in the tire-mounting seat, and the tire has opposed tire beads, comprising:

an annular member having a cable and annular first and second arms, and each arm movable by tension applied to the cable from a disengaged position to an engaged position in which each of the arms is adapted to apply pressure to a tire bead around the circumference of the tire.

13. Apparatus according to claim 12 wherein in the disengaged position the arms do not apply pressure to a tire bead.

14. Apparatus according to claim 13 including a tensioner adapted to selectively increase tension on the cable and decrease tension on the cable.

15. Apparatus according to claim 12 in which the annular member further comprises plural radial sections, each of the plural radial sections interconnected to adjacent radial sections with an expansion joint to allow relative movement of adjacent radial sections.

16. Apparatus for locking a tire mounted to a rim wherein the rim has a tire-mounting seat between opposed rim flanges with a rim interior surface in the tire-mounting seat, and the tire has opposed tire beads, comprising:

an annular member adapted for extending circumferentially around the rim, and having a tube extending therethrough;

a tensioner extending through the tube;

tensioning means for selectively increasing and decreasing tension on the tensioner; and tire bead locking means movable from an unlocked position to a locked position by the tensioning means and for locking a tire to a rim.

17. Apparatus according to claim 16 wherein the tire bead locking means further comprises first and second arms attached to the annular member and extending away from the annular member in substantially opposite directions, wherein in the unlocked position the arms do not apply pressure to a tire.

18. Apparatus according to claim 17 in which the tensioning means further comprises a housing into which opposite ends of the tensioner extend through a guide and into an interior bore in the body, wherein the tensioner is connected to a nut in the interior bore and wherein tension is applied to the tensioner by rotating a bolt to cause the nut to slide in the interior bore.

19. Apparatus according to claim 16 further comprising foam insert retention means for retaining an annular foam insert outwardly of the annular member.

20. Apparatus according to claim 19 in which the foam insert retention means is defined by a T-shaped extension attached to and extending radially outwardly of the annular member.

* * * * *